United States Patent
Albertella

(10) Patent No.: US 11,870,388 B2
(45) Date of Patent: Jan. 9, 2024

(54) MODULAR, RETRACTABLE, SOLAR ARRAY AND METHODS FOR MANUFACTURING SAME

(71) Applicant: RESILIENT ENERGY & INFRASTRUCTURE, LLC, Madison, TN (US)

(72) Inventor: Roberto Albertella, Biel (CH)

(73) Assignee: RESILIENT ENERGY & INFRASTRUCTURE, LLC, Madison, TN (US)

(*) Notice: Subject to any disclaimer, the term of this patent is extended or adjusted under 35 U.S.C. 154(b) by 0 days.

(21) Appl. No.: 16/014,654

(22) Filed: Jun. 21, 2018

(65) Prior Publication Data

US 2019/0006984 A1 Jan. 3, 2019

Related U.S. Application Data

(60) Provisional application No. 62/628,666, filed on Feb. 9, 2018, provisional application No. 62/526,131, filed on Jun. 28, 2017.

(51) Int. Cl.
H02S 30/20 (2014.01)
H02S 20/30 (2014.01)
H02S 30/10 (2014.01)

(52) U.S. Cl.
CPC .............. *H02S 30/20* (2014.12); *H02S 20/30* (2014.12); *H02S 30/10* (2014.12)

(58) Field of Classification Search
CPC ........... H02S 20/30; H02S 30/10; H02S 30/20
See application file for complete search history.

(56) References Cited

U.S. PATENT DOCUMENTS

| 6,423,895 B1* | 7/2002 | Murphy | H02S 30/20 136/245 |
| 9,559,232 B1 | 1/2017 | Naud | |
| 2007/0240442 A1* | 10/2007 | Costanzo | F25B 27/005 62/235.1 |
| 2012/0201015 A1* | 8/2012 | Robertson | F21L 14/04 362/183 |
| 2012/0313569 A1 | 12/2012 | Curran | |

(Continued)

FOREIGN PATENT DOCUMENTS

| WO | WO 2014/128475 A1 * | 8/2014 | ............ F24S 40/10 |
| WO | WO2015/074812 | 5/2015 | |

*Primary Examiner* — Golam Mowla
(74) *Attorney, Agent, or Firm* — McGlew and Tuttle, P.C.

(57) ABSTRACT

A portable, retractable, solar racking system comprises a modular set of solar panel frames, each solar panel frame comprising a solar panel, a plurality of arms, and a plurality of struts, the arms and the struts forming a structure to which the solar panel is secured, a pivoting connector assembly mechanically connecting one of the solar panel frames to another one of the solar panel frames to form a solar panel array having a longitudinal extent, the pivoting connector assembly of the solar panel frames configured to collapse the solar panel array along the longitudinal extent into a storage position and to expand the solar panel array along the longitudinal extent into an extended position in which each solar panel is tilted from vertical to an angle away therefrom, and the solar panel array comprising sets of wheels permitting the solar panel array to roll upon ground.

18 Claims, 28 Drawing Sheets

(56) References Cited

U.S. PATENT DOCUMENTS

| | | | |
|---|---|---|---|
| 2014/0285005 A1* | 9/2014 | Casteel | H02S 10/40 |
| | | | 320/101 |
| 2016/0281938 A1* | 9/2016 | Carpoff | F21L 14/04 |
| 2017/0141721 A1* | 5/2017 | Schmidt | F21V 21/22 |

* cited by examiner

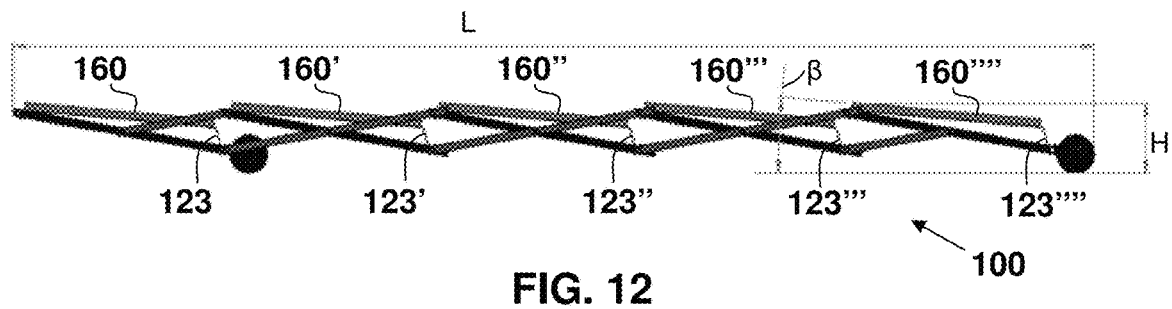
FIG. 12
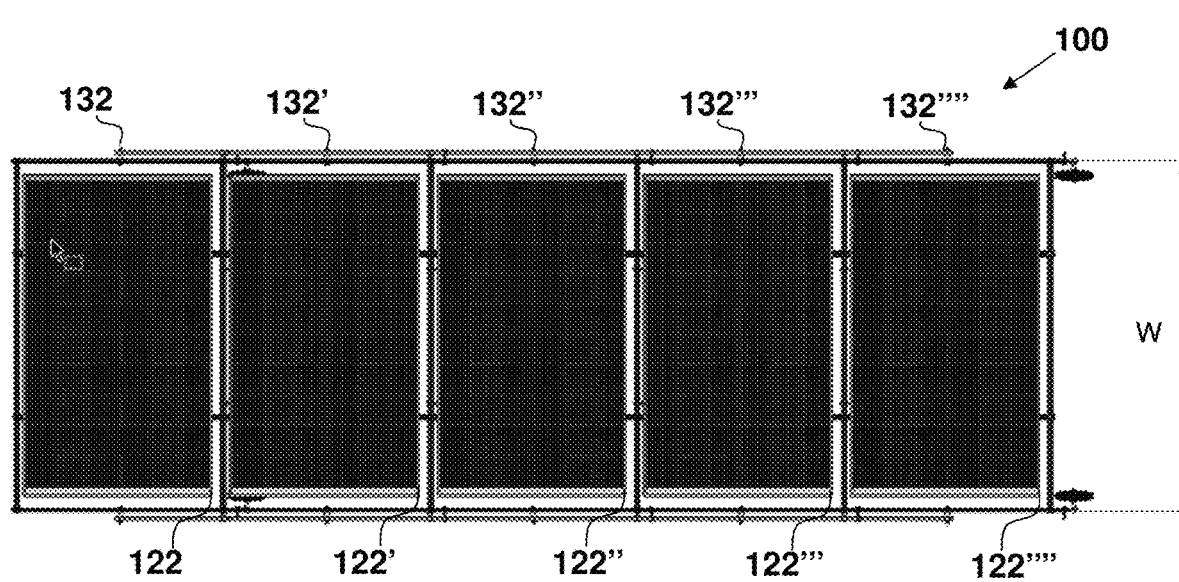
FIG. 13
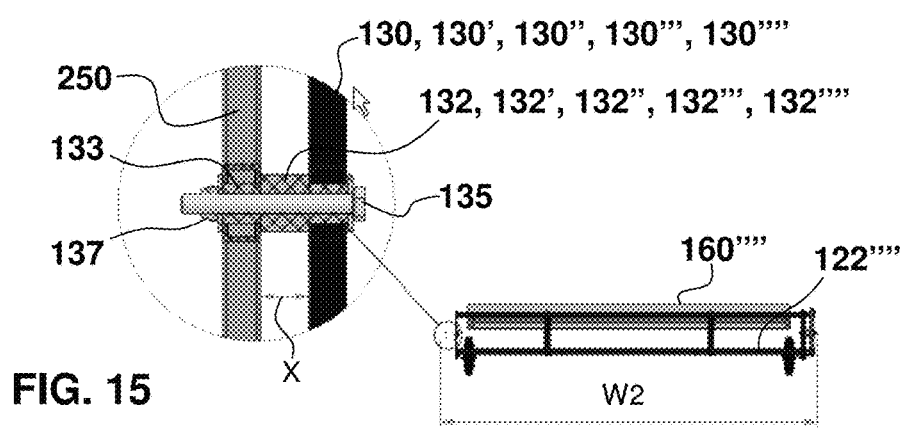
FIG. 15
FIG. 14

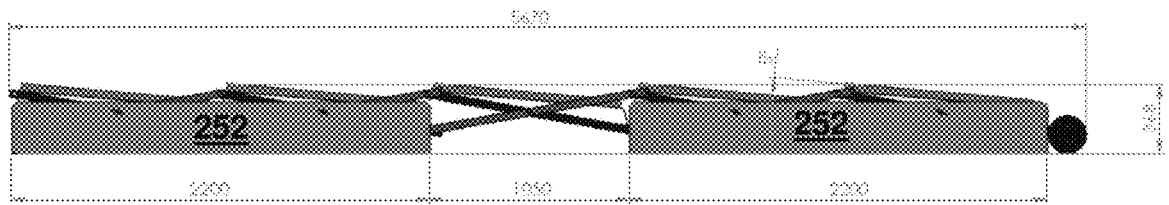
FIG. 17
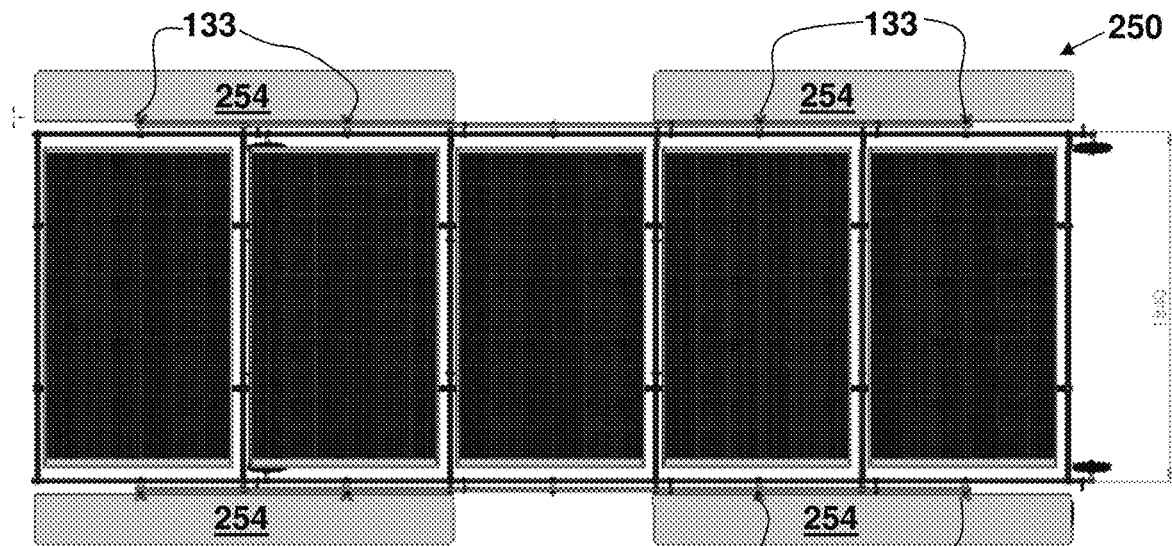
FIG. 18
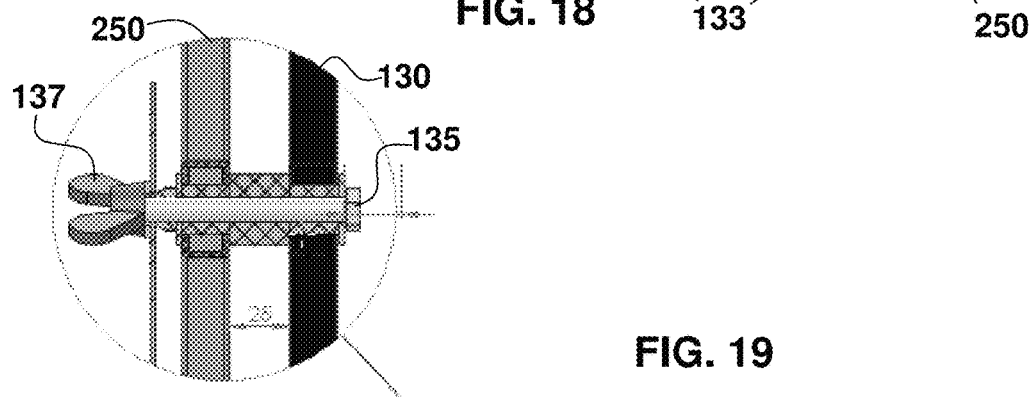
FIG. 20
FIG. 19
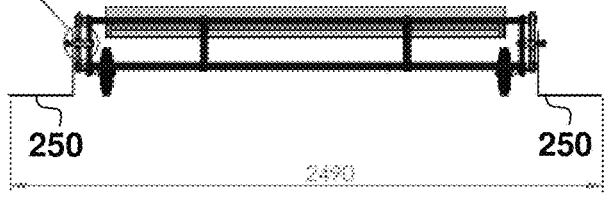

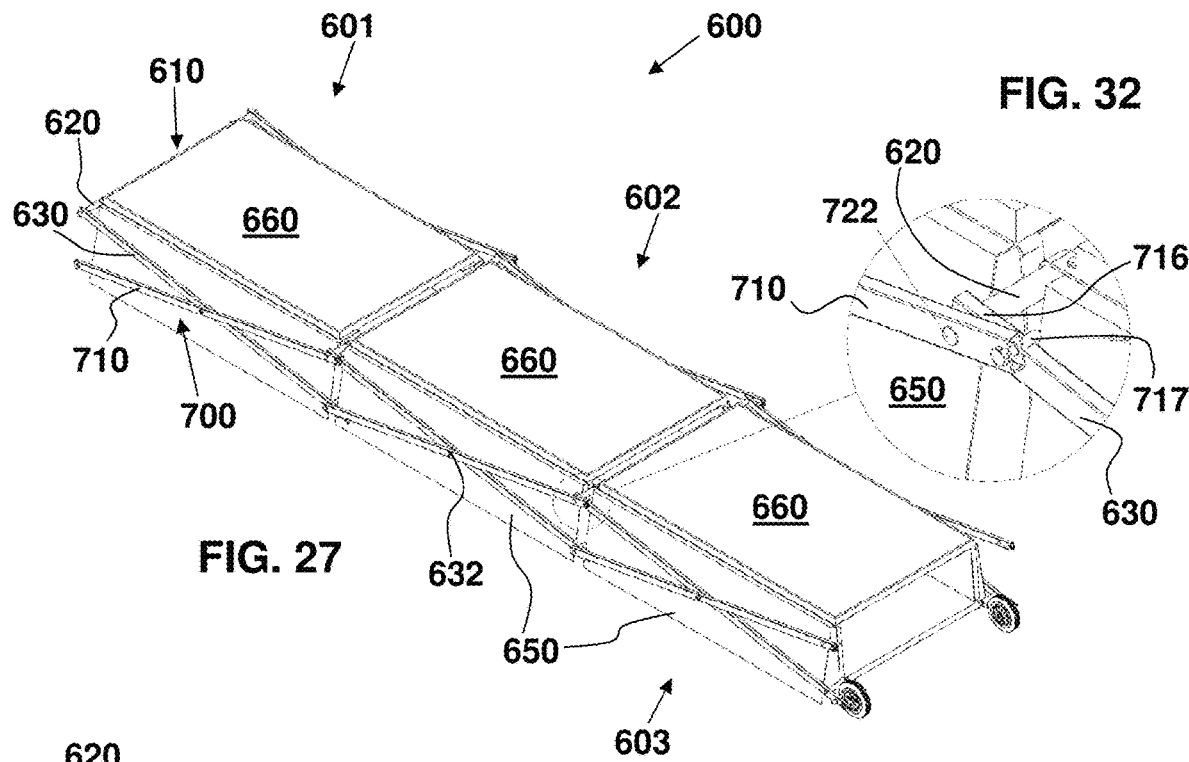
FIG. 27
FIG. 32
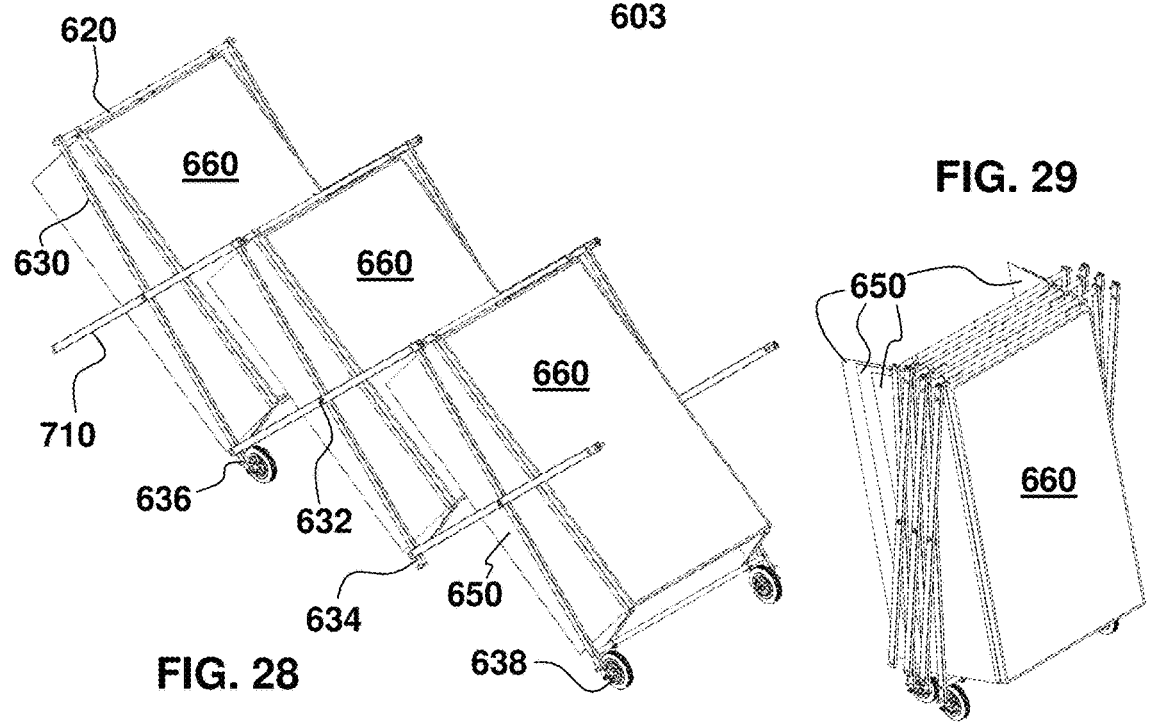
FIG. 28
FIG. 29

MODULAR, RETRACTABLE, SOLAR ARRAY AND METHODS FOR MANUFACTURING SAME

CROSS-REFERENCE TO RELATED APPLICATIONS

This application claims the priority, under 35 U.S.C. § 119, of copending U.S. Provisional Patent Application Nos. 62/526,131, filed Jun. 28, 2017, and 62/628,666, filed Feb. 9, 2018, the prior applications are herewith incorporated by reference herein in their entireties.

STATEMENT REGARDING FEDERALLY SPONSORED RESEARCH OR DEVELOPMENT

Not Applicable

FIELD OF THE INVENTION

The present systems, apparatuses, and methods lie in the field of solar, photovoltaic, power generation. The present disclosure relates to portable, modular, retractable, solar panel arrays, solar panel systems, and methods for manufacturing same.

BACKGROUND OF THE INVENTION

The system power of a photovoltaic system depends on the number of photovoltaic panels that are used. Therefore, a usably functional photovoltaic (PV) system requires an expansive area. But, those areas are valuable for other uses and can be exploited for those uses if the photovoltaic system was removed. For example, sport facilities (such as tennis courts or soccer fields) and private gardens with little or no use during the day are all surfaces that could be converted into solar power for at least a few or many hours per day and could return to their original function at other times if the system with photovoltaic panels could easily occupy a small area when light exposure is not desired to be exploited.

Despite continuous advances in PV technology and the sector's record growth, there are numerous situations where today's traditional PV installation projects are unfeasible. Obstacles include sites with time or land constraints, situations when the need for energy is immediate or its duration unknown, or when upfront capital requirements are too high.

Having efficient PV systems is beneficial only if they can be incorporated in a manner that is cost effective and not burdensome. This is no easy task because it typically takes many years for a roof-mounted solar installation to pay for itself. Also, roof mounted systems are hard to access, and there have been many reports of safety concerns. Another drawback associated with installation of PV panels is that it is expensive, not entirely due to the cost of panels, which have significantly decreased in recent years, but rather due to associated hardware and soft costs that are required for installation, such as labor associated with system design and installation.

One retractable, modular structure for PV panels is described and shown in International Publication No. WO 2015/074812 to Albertella. This structure includes a box in which a set of solar panels reside. Pantograph-like articulation bars were described as allowing movement of the system to extend fully out from a protective box and retract fully into the box when deployment was no longer desired. However, the weight of the solar panels made it difficult to create a system having more than just a few panels that could actually deploy and retract. Not only was the extension/retraction mechanism in FIGS. 1a and 1b insufficient to extend or retract the panels so connected but the weight of the extended structure was too great to permit the actual desired number of panel to be included in a single configuration.

Thus, a need exists to overcome the problems with the prior art systems, designs, and processes as discussed above.

SUMMARY OF THE INVENTION

The systems, apparatuses, and methods described provide portable, modular, retractable, solar panel arrays, solar panel systems, and methods for manufacturing same that overcome the hereinafore-mentioned disadvantages of the heretofore-known devices and methods of this general type and that provide such features with quick and easy installation and with similar quick and easy take-down and storage. The arrays, systems, and methods provide a supporting structure that allows the photovoltaic panels to be easily put in service and to be easily removed from service. The supporting structure is reliable and safe in operation.

With the foregoing and other objects in view, there is provided, a portable solar panel system comprising a vehicle-movable container and a modular set of solar panel arrays. The arrays are sized to removably store within the container. Each solar panel array has a connection device that mechanically and electrically connects another one of the solar panel arrays thereto in series along a longitudinal direction, a plurality of solar panel frames each comprising a solar panel, and at least two sets of wheels permitting the solar panel array to roll upon ground. Each solar panel frame is connected to another solar panel frame at a pivoting connection such that the solar panel array can collapse longitudinally into a volume-minimized storage position and expand longitudinally into an extended position in which each solar panel is tilted between ninety degrees from vertical to horizontal.

In accordance with another feature, the solar panel array can expand longitudinally into an extended position in which each solar panel is tilted between forty degrees from vertical to twenty degrees from vertical.

In accordance with a further feature, the solar panel array can expand longitudinally into an extended position in which each solar panel is tilted between twenty degrees from vertical to four degrees from vertical.

In accordance with an added feature, the solar panel array can expand longitudinally into an extended position in which each solar panel is tilted between twenty degrees from vertical to horizontal.

With the foregoing and other objects in view, there is provided, a portable, retractable, solar racking system comprising a modular set of solar panel frames, each solar panel frame comprising a solar panel, a plurality of arms, and a plurality of struts, the arms and the struts forming a structure to which the solar panel is secured, a pivoting connector assembly mechanically connecting one of the solar panel frames to another one of the solar panel frames to form a solar panel array having a longitudinal extent, the pivoting connector assembly of the solar panel frames configured to collapse the solar panel array along the longitudinal extent into a volume-minimized storage position and to expand the solar panel array along the longitudinal extent into an extended position in which each solar panel is tilted from substantially vertical to an angle away from vertical, and the solar panel array comprising at least two sets of wheels permitting the solar panel array to roll upon ground.

In accordance with another feature, the solar panel has an orthogonal axis, the plurality of struts comprise an upper frame strut and a lower frame strut, and the pivoting connector assembly of each of the solar panel frames is configured to expand and contract the solar panel array between a closed configuration in which the orthogonal axis of the solar panel is substantially parallel to the longitudinal extent and the upper frame strut and the lower frame strut are substantially parallel to one another and are substantially parallel to ground with the upper frame strut disposed above the lower frame strut to define a first plane being substantially vertical and substantially orthogonal to the longitudinal extent, and an open configuration in which the upper and lower frame struts are parallel to one another and not parallel to ground to define a second plane that is at a given angle to ground to place the orthogonal axis of the solar panel at the given angle from vertical In accordance with a further feature, the given angle to ground is between approximately 10 degrees and approximately 40 degrees, further, between approximately 25 degrees and approximately 35 degrees, in particular, the given angle to ground is approximately 30 degrees.

In accordance with an added feature, each of the sets of wheels has a first wheel and the first wheel is adjacent a vertex of the given angle.

In accordance with an additional feature, the solar panel has an orthogonal axis, the plurality of struts comprise an upper frame strut and a lower frame strut, and the pivoting connector assembly of each of the solar panel frames is configured to expand and contract the solar panel array between a closed configuration in which the orthogonal axis of the solar panel is substantially parallel to the longitudinal extent and the upper frame strut and the lower frame strut are substantially parallel to one another and are substantially parallel to ground with the upper frame strut disposed above the lower frame strut to define a first plane being substantially vertical and substantially orthogonal to the longitudinal extent, and an open configuration in which the first plane is rolled approximately ninety degrees and pitched to a given angle to ground to place the orthogonal axis of the solar panel at the given angle from vertical and thereby orient the orthogonal axis to point towards the Sun.

In accordance with yet another feature, the pivoting connector assembly of each of the solar panel frames is configured to expand the solar panel array longitudinally into an extended position in which each solar panel is tilted from substantially vertical to an angle away from vertical such that adjacent ones of the solar panels do not overlap when facing the Sun to an extent that would place shadow from one of the solar panels onto another one of the solar panels.

In accordance with yet a further feature, the angle is at least approximately 45 degrees away from vertical, further, at least approximately 60 degrees away from vertical, in particular, approximately 90 degrees away from vertical.

In accordance with yet an added feature, the pivoting connector assembly of each of the solar panel frames is configured to expand the solar panel array longitudinally into an extended position in which each solar panel is tilted from substantially vertical to substantially coplanar with each of the other solar panels.

In accordance with yet an additional feature, the plurality of arms comprises a first arm and a second arm and the pivoting connector assembly of each of the solar panel frames is configured to expand the solar panel array longitudinally into an extended position in which each solar panel is tilted from substantially vertical to an angle from ground less than approximately 30 degrees and is substantially parallel with the other solar panels.

In accordance with again another feature, the angle from ground is approximately five degrees.

In accordance with again a further feature, in the volume-minimized storage position, each solar panel of the solar panel array is substantially upright.

In accordance with again an added feature, in the extended position, each solar panel of the solar panel array tilted from upright to an angle away from vertical of between approximately 45 degrees from vertical to approximately 90 degrees from vertical.

In accordance with again an additional feature, the set of solar panel frames comprise six solar panel frames and the pivoting connector assembly is five pivoting connector assemblies mechanically connecting one of the solar panel frames to another adjacent one of the solar panel frames to form the solar panel array.

In accordance with still another feature, the solar panel array is a plurality of solar panel arrays and each of the solar panel arrays is configured to be connected to another adjacent solar panel array, and which further comprises an array installation having an interior shaped to store the plurality of solar panel arrays therein, the installation being sized and shaped to removably load onto and load off a vehicle with the plurality of solar panel arrays stored therein.

In accordance with still a further feature, the array installation is a container and the vehicle is a container truck.

In accordance with a concomitant feature, the installation further comprises a power storage and distribution controller and which further comprises electrical extension cables electrically connecting the solar panel arrays to one another and electrically connecting at least one of the solar panel arrays to the power storage and distribution controller.

The systems, apparatuses, and methods described herein remove the complexities, time, and cost of current day's typical solar installations and make solar power immediately accessible, affordable, and easy to deploy—where others cannot. The retractable PV racking technology is configured to radically simplify and accelerate PV deployments (from weeks to hours, months to days . . . ), to enable deployments of variable durations, to enable lease financing (in markets where the risks are often considered too high), and to provide end users the ability to relocate solar assets as needed.

Although the systems, apparatuses, and methods are illustrated and described herein as embodied in portable, modular, retractable, solar panel arrays, solar panel systems, and methods for manufacturing same, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems, apparatuses, and methods.

Additional advantages and other features characteristic of the systems, apparatuses, and methods will be set forth in the detailed description that follows and may be apparent from the detailed description or may be learned by practice of exemplary embodiments. Still other advantages of the systems, apparatuses, and methods may be realized by any of the instrumentalities, methods, or combinations particularly pointed out in the claims.

Other features that are considered as characteristic for the systems, apparatuses, and methods are set forth in the appended claims. As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one of ordinary skill in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the systems, apparatuses, and methods of the invention that are regarded as novel, it is believed that the systems, apparatuses, and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which:

FIG. 12 is a right side elevational view of another exemplary embodiment of a solar panel array in a fully extended position;

FIG. 13 is a top plan view of the solar panel array of FIG. 12;

FIG. 14 is a front elevational view of the solar panel array of FIG. 12;

FIG. 15 is an enlarged, fragmentary, cross-sectional view of an exemplary embodiment of a pivot boss, a side arm, and a fairing for the solar panel array of FIG. 12;

FIG. 17 is a side elevational view of the solar panel array and the side fairings of FIG. 16;

FIG. 18 is a top plan view of the solar panel array and side fairings of FIG. 17;

FIG. 19 is a front elevational view of the solar panel array and side fairings of FIG. 17;

FIG. 20 is an enlarged, fragmentary, cross-sectional view of another exemplary embodiment of a pivot boss, a side arm, and a fairing for the solar panel array of FIG. 17;

FIG. 27 is a perspective view of another exemplary embodiment of a solar panel array with three solar panel instances in a fully extended position;

FIG. 28 is a perspective view of the solar panel array of FIG. 27 in an intermediate extended position;

FIG. 29 is a perspective view of the solar panel array of FIG. 27 in a fully collapsed position;

FIG. 32 is an enlarged, fragmentary, perspective view of a frame portion of the solar panel array of FIG. 27 with a stop pin limited expansion of the solar panel array;

DETAILED DESCRIPTION OF THE EMBODIMENTS

Figure 1:
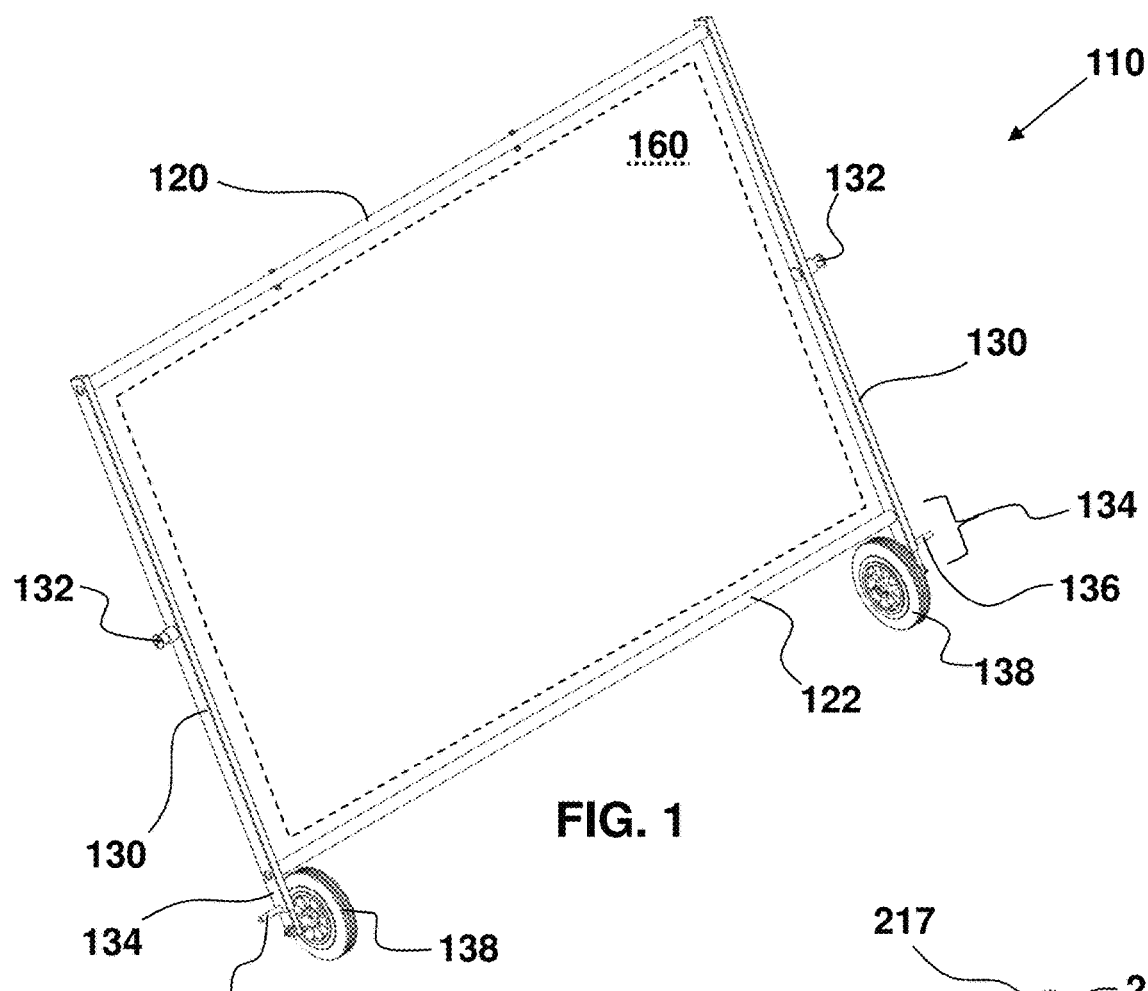
FIG. 1 is a perspective view of an exemplary embodiment of a solar panel frame for a multiple solar panel array with the solar panel removed.

As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one skilled in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the features of the systems, apparatuses, and methods that are regarded as novel, it is believed that the systems, apparatuses, and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems, apparatuses, and methods will not be described in detail or will be omitted so as not to obscure the relevant details of the systems, apparatuses, and methods.

Before the systems, apparatuses, and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, top/bottom, and proximal/distal. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

Herein various embodiments of the systems, apparatuses, and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Figure 7:
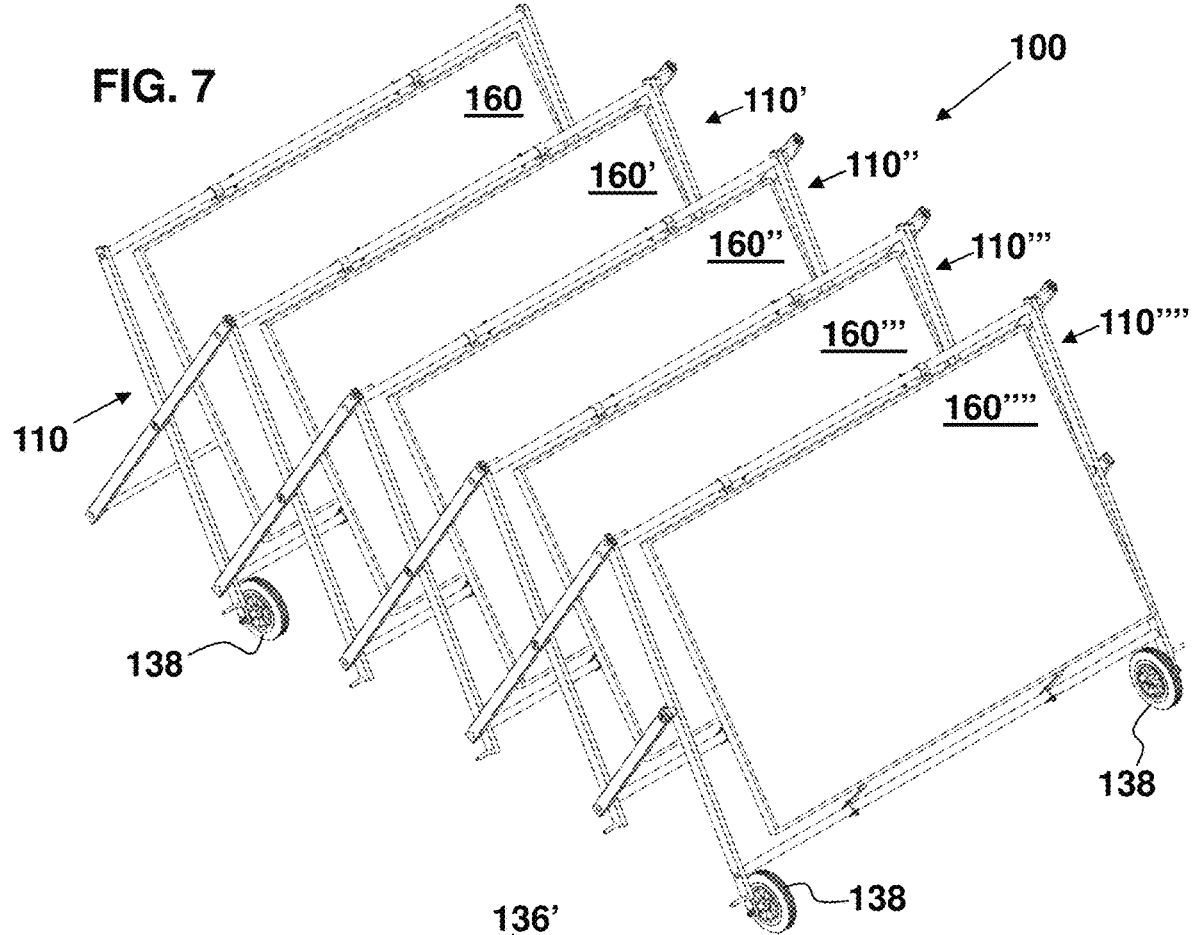
FIG. 7 is a perspective view of the solar panel array of FIG. 6 with the five solar panels shown.

Described now are exemplary embodiments. Referring now to the figures of the drawings in detail and first, particularly to FIGS. 1 to 3, there is shown an exemplary embodiment of a first proximal solar panel instance having a solar panel frame 110 for holding a photovoltaic panel 160 (shown in FIG. 1 only with dashed lines). This proximal solar panel frame 110, as will be described below and is shown in FIG. 7, forms a proximal end of a modular solar panel array 100 holding, in an exemplary embodiment, five photovoltaic panel instances, each comprising a solar panel 160. In the exemplary embodiment, the solar panel 160 is a single solar panel 160. "Single" as used herein is not intended to mean that the panel 160 must be one integral piece. Single is defined in a broad sense to include subsections that when combined together form the photovoltaic panel 160; this panel 160, therefore, can be one integral panel or it can comprise pieces put together such that the panel 160 within the frame 110 acts as a source of electricity production. While five panel instances are shown and described in the embodiment, this number is merely exemplary, as more or less panel instances can be included as described in further detail below. The proximal solar panel frame 110 comprises upper and lower horizontal struts 120, 122, which in this exemplary embodiment are round tubes 120, 122, connected to two vertical side arms 130 that can be, for example, rectangular solid bars or rectangular hollow tubes. In this exemplary embodiment, the struts 120, 122 and arms 130, when connected together, form a rectangle to fit a rectangular photovoltaic panel 160. This shape is merely one example and can be, for example, square. Herein, the words "strut" and "tube" are used interchangeably. "Strut" and "tube" both refers to the structure in general but, where the feature is a tube in the exemplary embodiments shown in the drawing figures, then the word tube is used. Therefore, both "strut" and "tube" are used here in a broad sense and are not limited to the exemplary cylindrical structure depicted but also refer to other equivalent structures. The struts and tubes 120, 122 can take any geometric form and, therefore, when "tube" is used, it includes all shaped structures that can provide support of the solar panel frame 110 along these sides, which sides here are horizontal. Tube is used below in the exemplary embodiment instead of the word strut only for convenience; in other words, the struts 120, 122 are not limited to being only tubes. The connections of the tubes 120, 122 to the side arms 130 in the proximal-most frame 110 is a fixed connection. Each vertical side arm 130 of the proximal solar panel frame 110 has a hollow lower bore in which the one end of the lower round tube 122 is secured respectively. This bore is sized to rotatably fit a lower torsion bar 220' therethrough (as explained below) and, because the hollow is open to the exterior, passage of the lower torsion bar 220' into the hollow of the lower round tube 122 is permitted. The lower round tube 122 also is connected to the side arms 130 at distance above a lower end of the side arms 130. This connection, therefore, creates a lower extent 134 at each of the side arms 130. An exterior pivot boss 132 projects from a midpoint of the side arms 130 away from an outside surface of each side arm 130. A stop pin 136 projects from the outside surface of the side arms 130 at the lower extent 134. The stop pin 136 can be attached to the lower extent 134 in any number of ways, for example, by welding, brazing, soldering, or with an adhesive, or it can have a lower screw that turns the stop pin 136 into the material of each side arm 130. A wheel 138 is rotatably connected to a lowest portion of each of the lower extents 134. As will be described in further detail below, the wheel 138 is positioned on interior side of the side arms 130 to permit expansion of the solar panel array 100 along an array line and to permit retraction into a smallest possible contracted position for storage, for example, one that is minimized in terms of volume.

Figure 2:
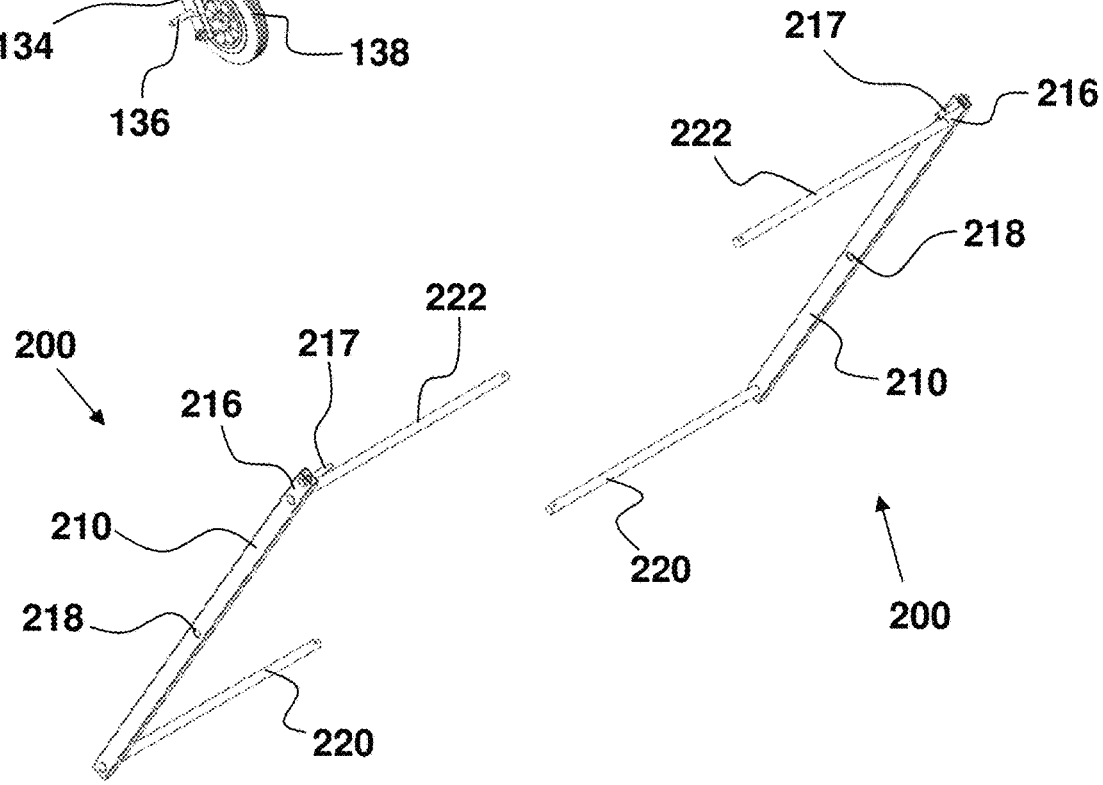
FIG. 2 is a perspective view of an exemplary embodiment of a pair of torsion subframes for the solar panel frame of FIG. 1.
Figure 3:
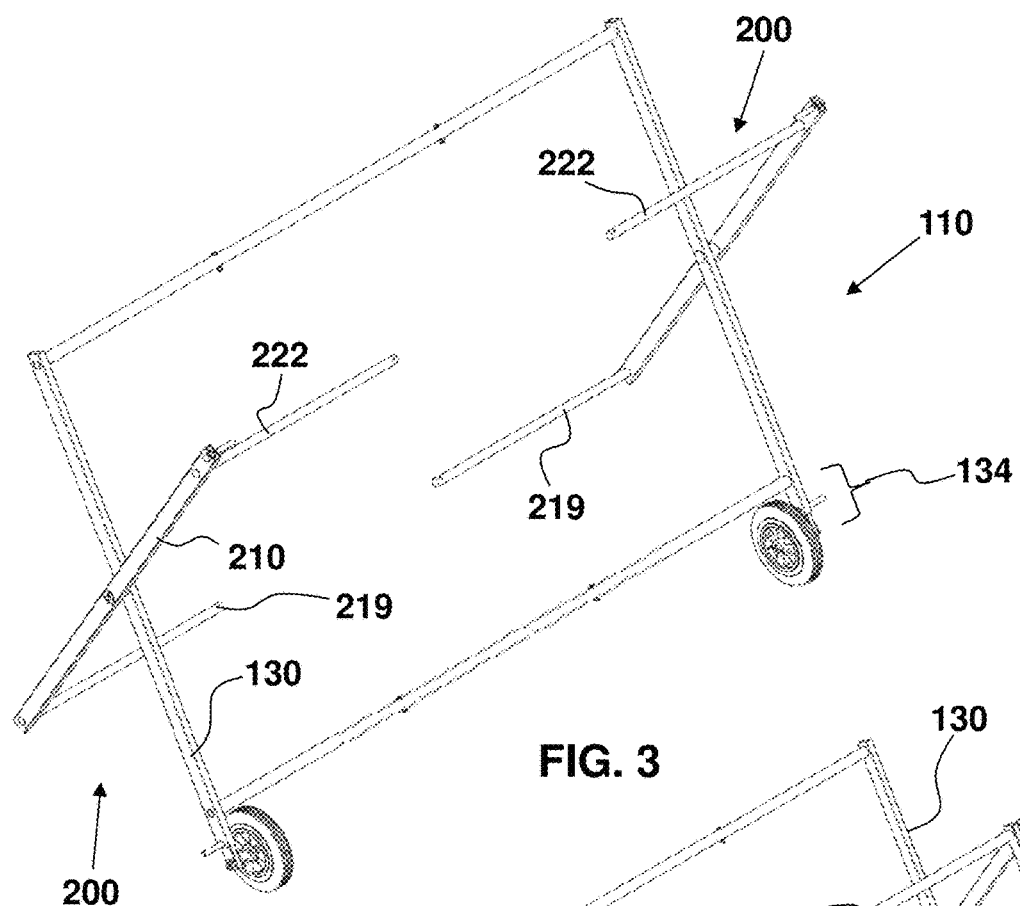
FIG. 3 is a perspective view of the solar panel frame of FIG. 1 and the pair of torsion subframes of FIG. 2 assembled as a proximal solar panel instance of a multiple solar panel array with the solar panel removed.

Two opposing pivoting connector assemblies 200 are shown in FIG. 2. This exemplary embodiment is in the form of opposing torsion subframes 200. Each of the torsion subframes 200 has a vertical side strut 210. A lower torsion bar 220 is fixed to a lower end 212 of each of the side struts 210 and projects in an inwards direction. An upper torsion bar 222 is fixed to an upper location of each of the side struts 210 at a distance from an upper end 214 of the side strut 210 to form an upper extent 216 of the side strut 210, the upper torsion bar 222 similarly projecting in the inwards direction. A stop pin 217 projects from an inside surface of the side strut 210 at the upper extent 216. The stop pin 217 can be attached to the upper extent 216 in any number of ways, for example, by welding, brazing, soldering, or with an adhesive, or it can have a lower screw that turns the stop pin 217 into the material of each side strut 210. A pivot port 218 is positioned at a midpoint of the side strut 210 and is sized to fit the pivot boss 132 therein securely so that the side strut 210 can rotate freely about the axis of the pivot boss 132. FIG. 3 shows the torsion subframes 200 pivotally connected to each of the side arms 130 about the pivot bosses 132, the two being positioned at generally a ninety-degree angle to define an intermediate opened position of the proximal solar panel frame 110 and the two torsion subframes 200; the solar panel frame 110 and the two torsion subframes 200, together, defining a proximal solar panel instance of the multiple solar panel array 100.

Figure 4:
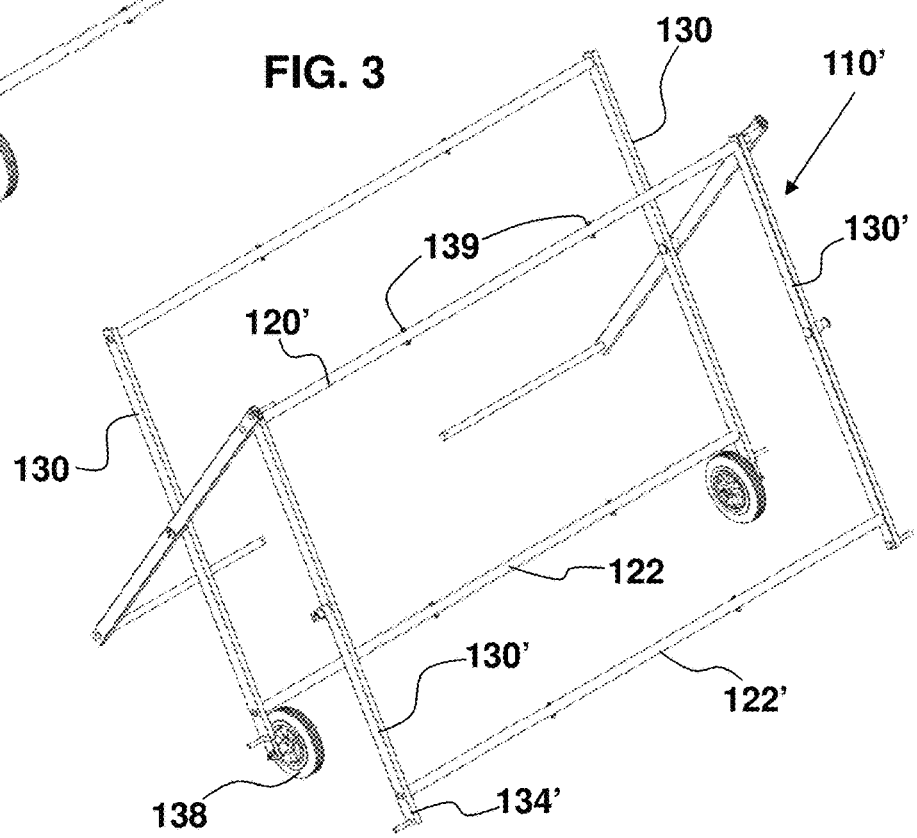
FIG. 4 is a perspective view of the proximal solar panel instance of FIG. 3 with a second solar panel frame and with both solar panels removed.

FIG. 4 illustrates a start to the progressive building of the modular configuration of the solar panel array 100 from the proximal solar panel instance. A second solar panel frame 110' is attached to the proximal solar panel instance. The second solar panel frame 110' is identical to the proximal solar panel frame 110 with a few exceptions. First, the second solar panel frame 110' does not have wheels 138 even though there is a lower extent 134'. Second, each vertical side arm 130' of the second solar panel frame 110' has a hollow bore in which respective ends of the upper and lower round tubes 120', 122' are secured. This bore is sized to rotatably fit the upper torsion bar 222 therethrough and because the hollow of the upper round tube 120' is open to the exterior, passage of the torsion bar 222 into the hollow of the upper round tube 120' is permitted. The two upper torsion bars 222, therefore, are slid inside the hollow interior of the upper round tube 120' on each end (explaining why they are not illustrated in FIG. 4) and the interior ends of the upper torsion bars 222 are rotatably fixed to the upper round tube 120' within the hollow interior by securing pins 139. In such a configuration, when the second solar panel frame 110' rotates with respect to the side arms 130, a rotational force is imparted to the torsion mechanism contained within the torsion bars 222. More particularly, during assembly, one end of the torsion bar is fixed while the solar panel array is in the closed or stored position (see, e.g., FIG. 11 in which the frames are substantially upright or vertical). As is known, a torsion bar works by resisting the torque placed on it. When the solar panel array is moved to the opened or use position, the end of the torsion bars fixed to the frame are not moved; thus, the other end of the torsion bar is twisted, causing torque to build up. The force holding the solar panel array in the open/use position is greater than the total torque applied by the torque bars. Nonetheless, that combined torque is significant. In particular, when the user desires to close the solar panel array for storage, the stored torque in the torsion bars assists the user in returning the solar panel instance to their starting closed/stored position, where the torque is substantially removed. In this regard, the upper torsion bars 222 are secured to the round tube 120' in a manner that prebiases the torsion mechanism to provide its stored rotational force to assist with moving the array 100 from an open, expanded, or unfolded position (shown in FIG. 10) towards a closed, stored, or collapsed position (shown in FIG. 11). In other words, the torsion bars 222 in this exemplary embodiment act to assist the user/users in closing the solar panel array 100 into a volume-minimized storage position or state. The closed, stored, or collapsed position is referred to herein for various embodiments of the solar panel array. In the closed position of the solar panel array 100, the portable, retractable, solar racking system comprises a pivoting connector assembly mechanically connecting one of the solar panel frames to another one of the solar panel frames to form a solar panel array having a longitudinal extent and this pivoting connector assembly is able to collapse the solar panel array along the longitudinal extent into a volume-minimized storage position and expand the solar panel array along the longitudinal extent into an extended position in which each solar panel is tilted from substantially vertical to an angle away from vertical.

Figure 5:
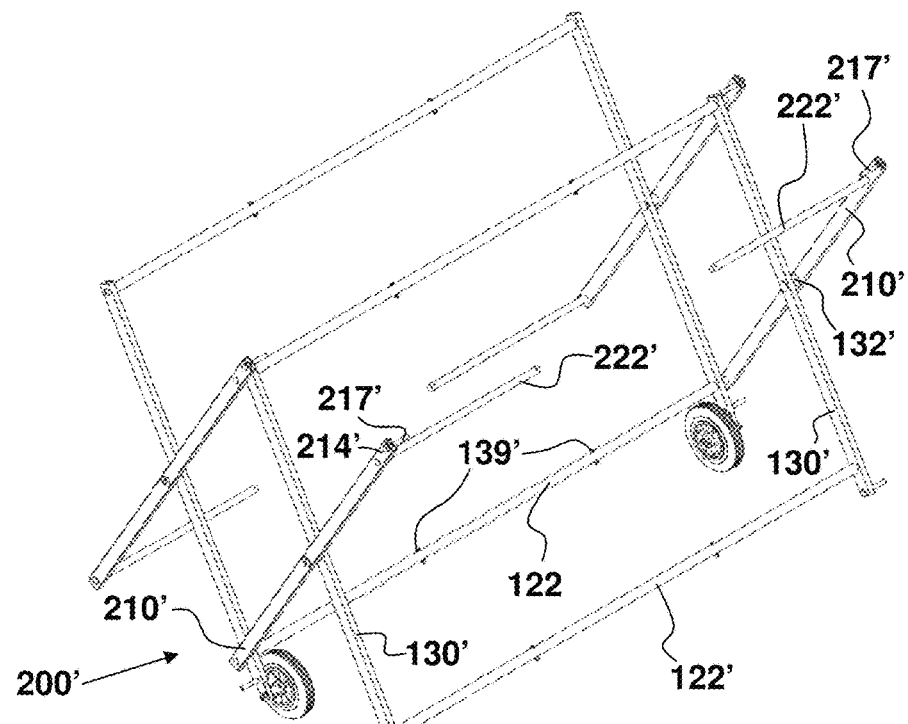
FIG. 5 is a perspective view of the proximal solar panel instance of FIG. 3 with a second solar panel instance having a second solar panel frame and a second pair of torsion subframes, both solar panels of the two solar panel instances being removed.
Figure 6:
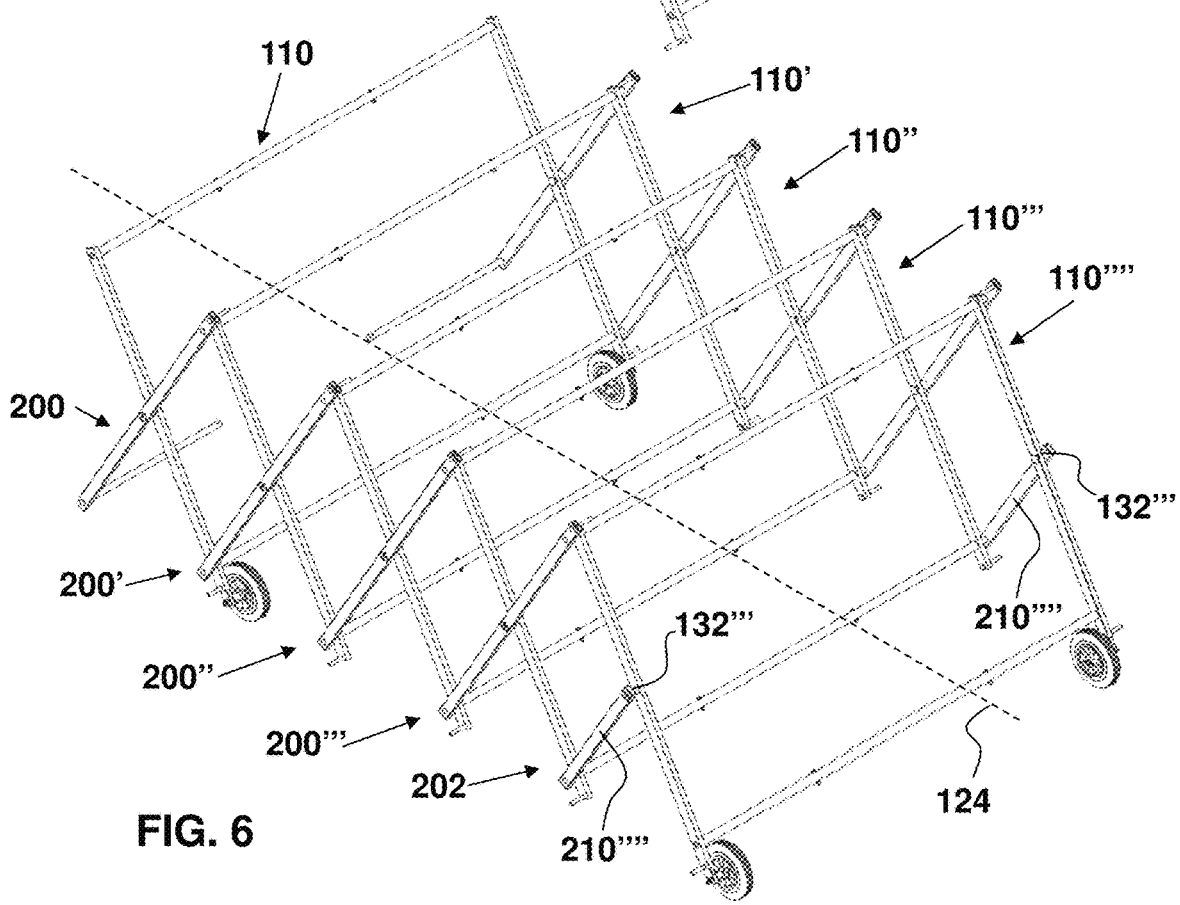
FIG. 6 is a perspective view of an exemplary embodiment of a solar panel array in an intermediate extended position and having five solar panel instances with all solar panels removed.

FIG. 5 illustrates the continued progressive modular configuration build of the solar panel array 100. In this figure, a second set of torsion subframes 200' is pivotally connected to respective pivot bosses 132' of each of the side arms 130'. The second set of torsion subframes 200' is identical to the first set of torsion subframes 200. As with the proximal solar panel frame 110, the side struts 210' each have a stop pin 217' projecting inwards at the upper end 214'. In FIG. 5, the upper torsion bars 222' are exposed to the environment and are still unconnected (but will be connected to a third solar panel frame as shown in FIG. 6). In contrast, the non-illustrated lower torsion bars of the torsion subframes 200' are contained within the hollow of the lower round tube 122. This connection is part of the connection that secures the proximal solar panel instance to the second solar panel instance. In particular, the lower torsion bars are slid inside the hollow interior of the lower round tube 122 on each end (explaining why they are not illustrated in FIG. 5) and the interior ends of the lower torsion bars are rotatably fixed to the lower round tube 122 in the interior hollow by securing pins 139'. In such a configuration, when the side struts 210' rotate with respect to the lower round tube 122, a rotational force is imparted to the torsion mechanism contained within the lower torsion bars. In this regard, the lower torsion bars of the torsion subframes 200' are secured to the lower round tube 122 in a manner that prebiases the torsion mechanism to provide its stored rotational force to assist with moving the array 100 from an open or unfolded position (shown in FIG. 10) towards a closed or collapsed position (shown in FIG. 11). In other words, the lower torsion bars act to assist the user/users in closing the solar panel array 100 for storage. The connection between each solar panel instance occurs directly, i.e., the torsion bars directly connect the side arms and the side struts to the round tubes. This connection replaces any other type of bearing and, therefore, significantly reduces material, production, and assembly costs while increasing the lifespan of the whole system, which is much more "elastic" as well and, therefore, more easily adapts to uneven ground.

This progressive building of the solar panel array 100 continues with consecutive installations of a third solar panel frame 110'', a third torsion subframe 200'', a fourth solar panel frame 110''', and a fourth torsion subframe 200''', the solar panel array 100 thereby defining a longitudinal extent 124 along which (or parallel to which) the solar panel array 100 can open and close (in this exemplary embodiment, opening and closing in the manner of an accordion). A fifth torsion subframe 202 is different from the other torsion subframes in that the fifth side struts 204 are half the size of the side struts 210, 210' of the first four torsion subframes. The fifth side struts 210'''' only extend up to the pivot boss 132''' of the fifth solar panel frame 110''''. It is noted that the apostrophe "'" is used herein with a reference numeral to indicate the same part but on a different solar panel instance of the solar panel array 100. This apostrophe is consecutively added for each of the five instances from one apostrophe to four apostrophes. Sometimes herein a reference is made to one part numeral and the other repetitive numerals are not shown. This does not mean that the particular singular use does not apply to others of the repetitive parts and, oftentimes, the repetition is not used merely for brevity. At other places herein, in contrast, all five repetitive numerals with the one to four apostrophes are used. Similarly, this use should not be construed as always applicable to all five parts. Accordingly, those of skill in the art should understand that similar functional parts can be referred to herein even when the repetitive use is not made.

Figure 11A:
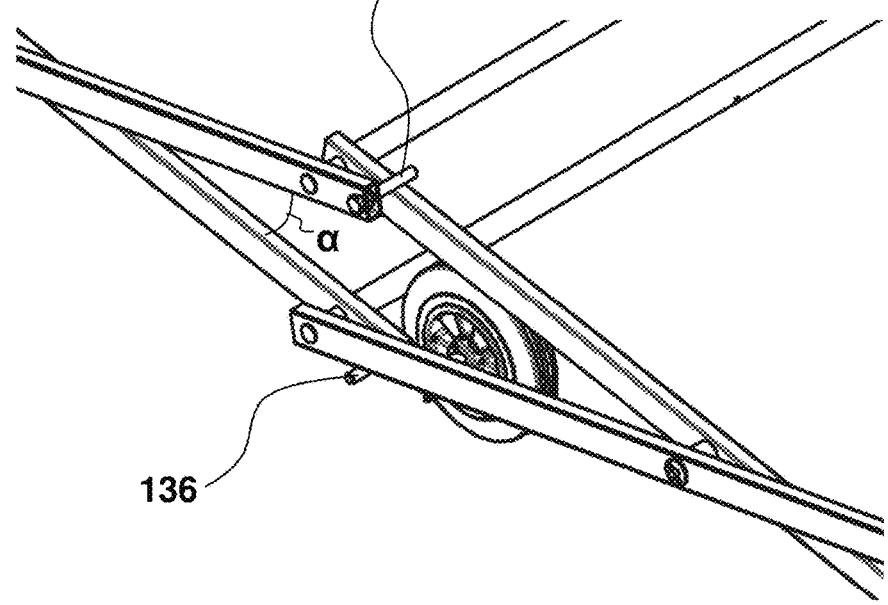
FIG. 11A is a fragmentary, enlarged, perspective view of a right side wheel portion of the proximal and second solar panel instances of FIG. 5 in a fully extended position with upper and lower stop pins preventing further expansion of the solar panel array.
Figure 10:
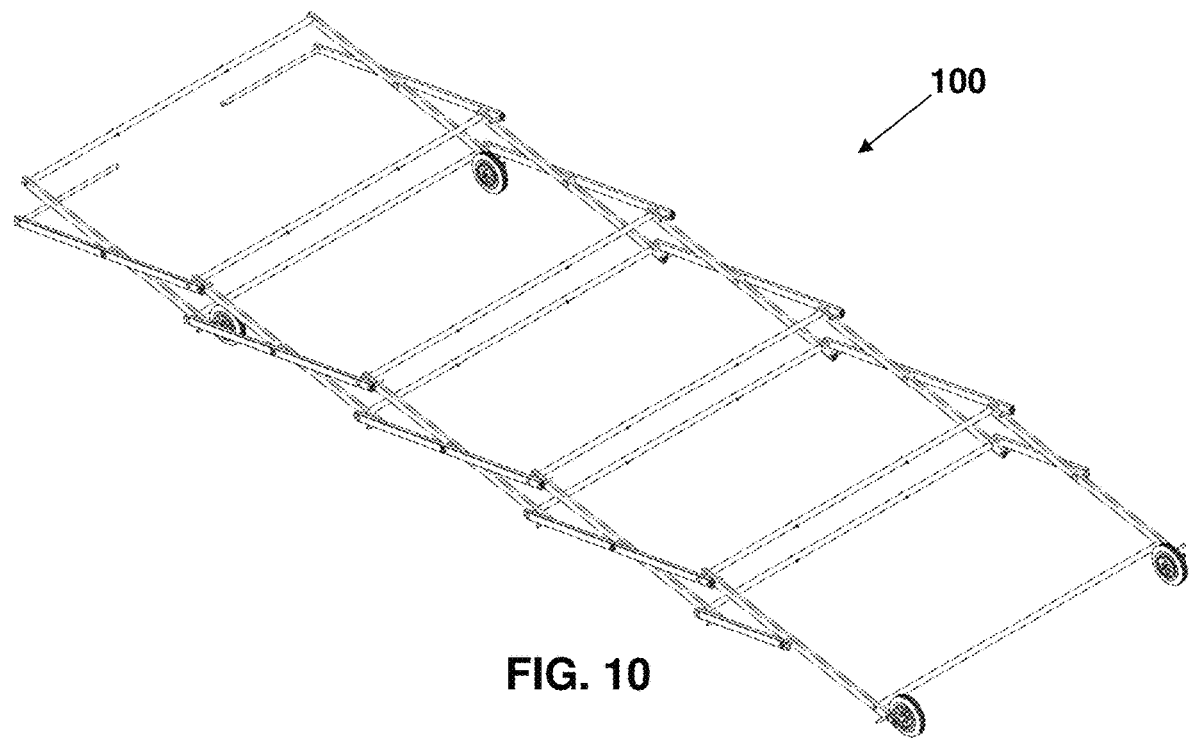
FIG. 10 is a perspective view of the solar panel array of FIG. 6 in a fully extended position.
Figure 11:
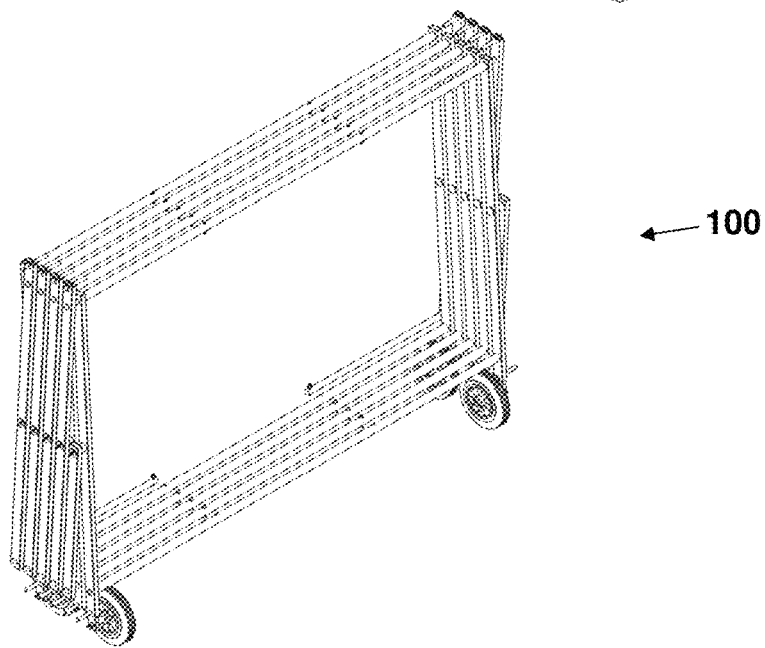
FIG. 11 is a perspective view of the solar panel array of FIG. 6 in a fully retracted or collapsed position.

FIGS. 1 and 3 through 6 show the solar panel frames 110, 110', 110", 110''', 110"" without the solar panel 160. FIG. 7, in contrast, shows the solar panels 160, 160', 160", 160''', 160"" connected inside each of the solar panel frames 110, 110', 110", 110''', 110"". The configuration of five solar panels shown in FIG. 7 is referred to herein as a modular solar panel array 100. The solar panel array 100 can be much greater than five panels. But, the weight of five standard solar panels is significant because each panel currently on the market and having a size of approximately 184 cm by 110 cm weighs approximately 20 kg and each solar panel instance weighs approximately 35 kg. Therefore, even if all of the components of the frame are made of extremely lightweight materials (e.g., titanium, aluminum, or plastics such as polyamide or polycarbonate), it is desirable to counter gravity to cause self-opening to prevent immediate or too fast opening of the solar panel array 100. Accordingly, torsion bars are included and associated with each solar panel frame. It is noted, however, that torsion bars can be removed if desired in alternative configurations, of which description is included below. When included, the torsion bars are prebiased to provide stored rotational force to assist with moving the array 100 from the unfolded position (FIG. 10) towards the collapsed position (shown in FIG. 11). Accordingly, when a user desires/users desire to open the solar panel array 100 from the collapsed position shown in FIG. 11 to the unfolded position shown in FIG. 10, the torsion bars slow down the expansion speed of the solar panel array 100 to a rate that a single user or no more than two users can control. The more that the solar panel array 100 unfolds from the collapsed position of FIG. 11, the harder it is to move back to the collapsed position. By prebiasing the torsion mechanism in this way, when the user desires/users desire to collapse the solar panel array 100, all of the torsion mechanisms act in concert to assist the user/users, thereby requiring the user/users to impart less force to an extent that is manageable by a single user/no more than two users. However, it becomes more and more difficult to collapse the solar panel array 100 the more the array 100 unfolds. Accordingly, to limit the expansion angle of the solar panel array 100, all of the lower and upper stop pins 136, 136' of each instance are placed to define a particular length of the lower extent 134, 134' and the upper extent 216, which length is approximately 115 cm in an exemplary embodiment. With such a configuration, the stop pins 136, 136', 217 prevent the side arms 130, 130' and side struts 210, 210' from rotating to a relative angle α of less than a given degree. In the exemplary embodiment, where the length of the lower and upper extents 134, 134', 216 is approximately 115 cm, the smallest relative angle α is approximately 20 degrees, which is depicted in FIG. 11A. In such a configuration, with extension struts 123 at the bottom thereof having a first length, the solar panels 160 secured in the frames 110 rest at an angle to one another when in the fully open position as shown in FIGS. 10 and 12, for example. At least when in the fully open position (and even before the fully open position), adjacent ones of the solar panels do not overlap one another when facing the sun to such an extent that does not place a shadow of one solar panel onto another one of the solar panels. In terms of angles, the solar panels tilt away from the vertical storage position to between approximately 45 degrees from vertical to substantially horizontal, in particular, between approximately 30 degrees and approximately horizontal, and, further, between approximately 15 degrees and approximately horizontal, and further still, between approximately 5 degrees and approximately horizontal. In an alternative exemplary configuration described below in FIG. 33 et seq., the extension struts 823 are depicted as longer to allow the solar panels 160 to expand and be substantially co-planar when in the fully open position of the array 100, 600, 800, that orientation defining an array plane 801.

In an exemplary configuration, all of the frame components of the solar panel array are made of aluminum. First, aluminum is a lightweight but strong material. Second, aluminum avoids electrolytic corrosion between the frame of the solar panel and the other components of the system. In a desirable exemplary configuration, screws and standardized parts are made of stainless steel.

Figure 8:
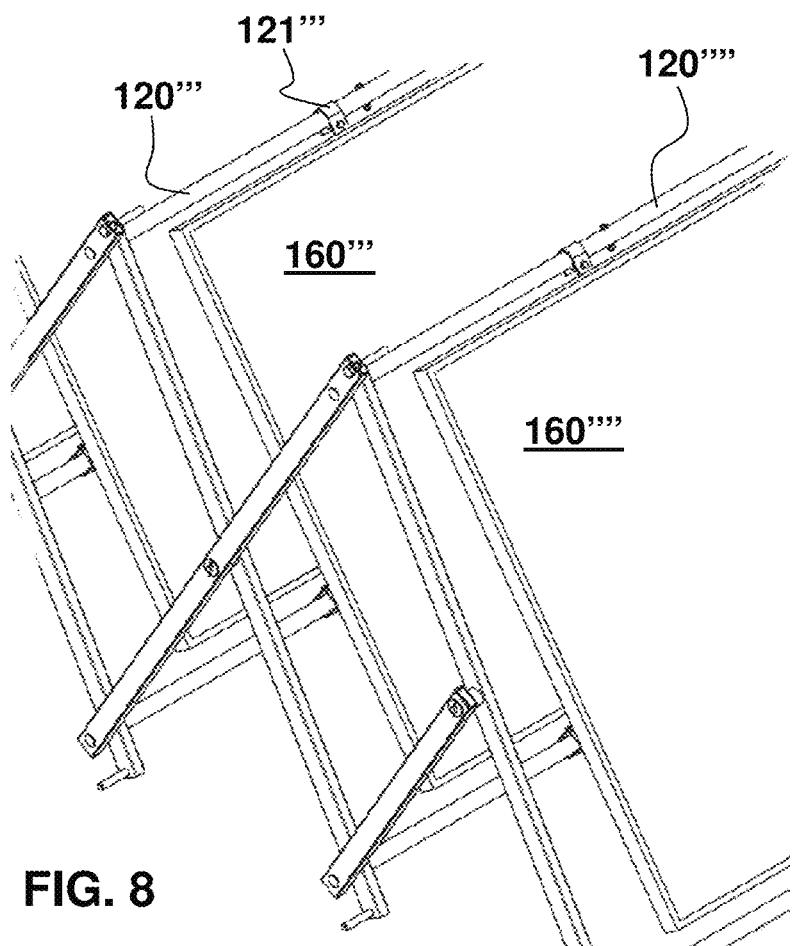
FIG. 8 is a fragmentary, enlarged, perspective view of a right side of the distal solar panel instances of the solar panel array of FIG. 7 with an upper connector clamp securing the upper edges of the solar panels to upper round tubes of the distal two solar panel instances.
Figure 9:
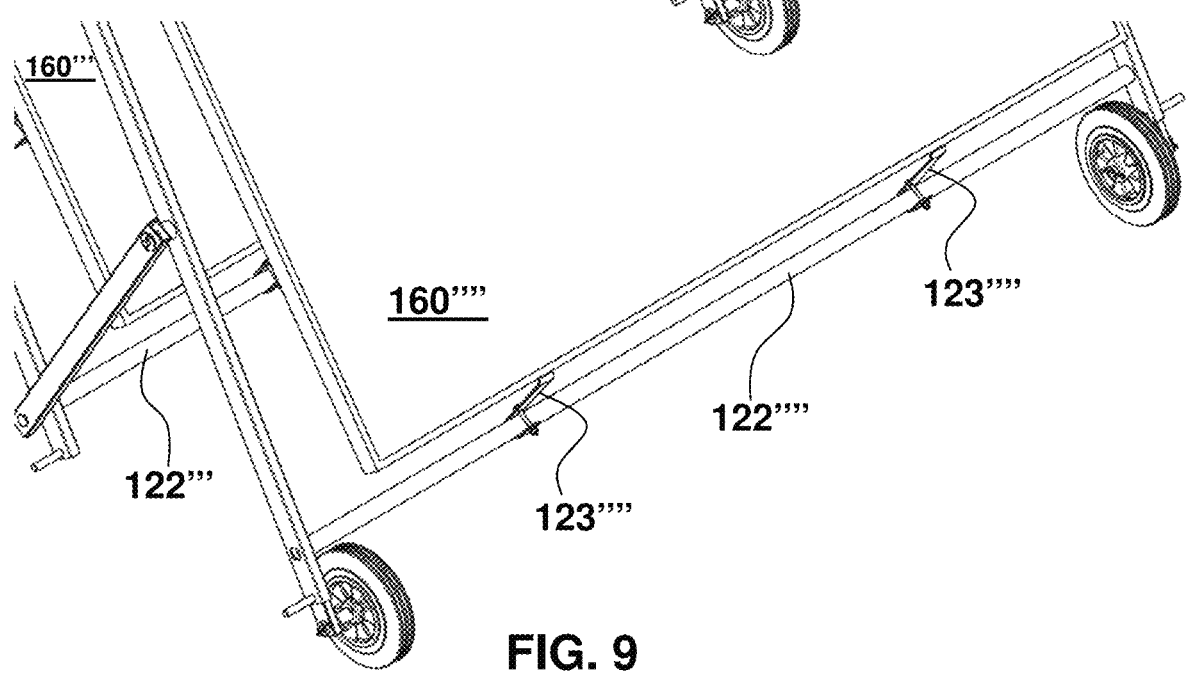
FIG. 9 is a fragmentary, enlarged, perspective view of a right side of the distal two solar panel instances of the solar panel array of FIG. 7 with lower extension struts securing the lower edges of the solar panels to lower round tubes of the two solar panel instances.

An exemplary embodiment of a connection of the solar panels 160, 160', 160", 160''', 160"" to the solar panel frames 110, 110', 110", 110''', 110"" is shown in FIGS. 8 and 9. In particular, with regard to the upper edge of the solar panels 160''', 160"", a clamp 121''', 121"" attached to the solar panels 160''', 160"" secures the upper round tubes 120''', 120"" to the solar panel frames 110''', 110"" by being partially wrapped around the upper round tube 120''', 120"" and then tightened by, for example, tightening a screw that reduces the circumference of the annular portion wrapped around the upper round tubes 120''', 120"". This connector is similar to a hose clamp. In the particular embodiment of FIGS. 7 to 9, two clamps 121''' are used for each solar panel 160'''. The lower edge of the solar panel frames 110''', 110"" can be attached to the lower round tubes with similarly shaped clamps 121''' or they can be attached, as shown in FIG. 9, by partially wrapping extension struts 123"" around the lower round tubes 122''', 122"", the struts 123"" having a portion that extends a distance away from the lower round tubes 122''', 122"" to position the lower edge of the solar panels 160''', 160"" further away from the lower round tubes 122''', 122"" than the upper edge is from the upper round tubes 120''', 120"". In the exemplary embodiment shown in these figures, the shape of the extension struts 123" is designed to compensate approximately sixteen (16) degrees of the approximate twenty (20) degree angle made by the side arms in order to obtain an approximately four-degree final tilt angle on the solar panel 160, which allows for self-cleaning while keeping a reasonable loss of efficiency. This configuration angles the solar panels 160''', 160"" upwards to better position the panels towards the sky for improved receipt of solar radiation. The ability of the invention to include clamps and extension struts that slide to any position on the upper and lower round tubes, respectively, permits the solar panel frame to accommodate any 60-cell solar panel available on the market with no modification and to place each solar panel 160 at any angle to the plane of the solar panel frame 110. This allows the panels to be staggered with respect to one another at any given angle an angle β from ground, such as at the approximately four or five degrees described herein or at an angle that places the solar panels 160 in the same plane when the solar panel array 100 is fully opened as explained below. Further, this configuration allows the solar panels 160, 160', 160", 160''', 160'''' to rest within the interior of the rectangular frame or at a distance therefrom.

FIGS. 12 and 13, for example, show an exemplary embodiment of the solar panel array 100 in the fully expanded position. In this embodiment, a height H from the top of the solar panel 160 to ground is, for example, 27 cm. The configuration of the extension struts 123, 123', 123", 123''', 123'''' that move the lower edge of the solar panel 160, 160', 160", 160''', 160'''' away from the lower round tube 122, 122', 122", 122''', 122'''' is clearly shown in FIG. 12. The exemplary length of the extension struts 123, 123', 123", 123''', 123'''' here place the solar panel 160, 160', 160", 160''', 160'''' at an angle β from ground of approximately four or five degrees.

The pivoting connector assembly of each of the solar panel frames is configured to expand the solar panel array longitudinally into an extended position in which each solar panel is tilted from substantially vertical to an angle from ground less than approximately 30 degrees and is substantially parallel with the other solar panels. In particular, the angle from ground is approximately five degrees.

Although, the length can be short enough to place the solar panel 160, 160', 160", 160''', 160'''' in line with the lower round tube 122, 122', 122", 122''', 122'''' (where the length is approximately zero) or long enough to place the solar panel 160, 160', 160", 160''', 160'''' substantially parallel to ground, which would be a length of between approximately 10 cm and approximately 20 cm. The total length L of the solar panel array 100 is approximately 5.67 meters and the width W of the solar panel frame 110 is approximately 1.84 meters (as can be seen, the solar panel 160 is slightly narrower than the inside of the solar panel frame 110). This means that a single solar panel array 110 has an area of approximately 10.4 m². This is not insignificant. As described above, adjacent solar panels do not overlap one another when facing the sun to such an extent that does not place a shadow of one solar panel onto another one of the solar panels.

One potential drawback of a long, relatively flat, solar panel array 100 is that it can be moved when a strong enough wind occurs. This is especially true when a number of solar panel arrays 100 are connected together in series. It is, therefore, desirable to prevent as much wind-induced movement as of the solar panel array 100 as possible.

Figure 16:
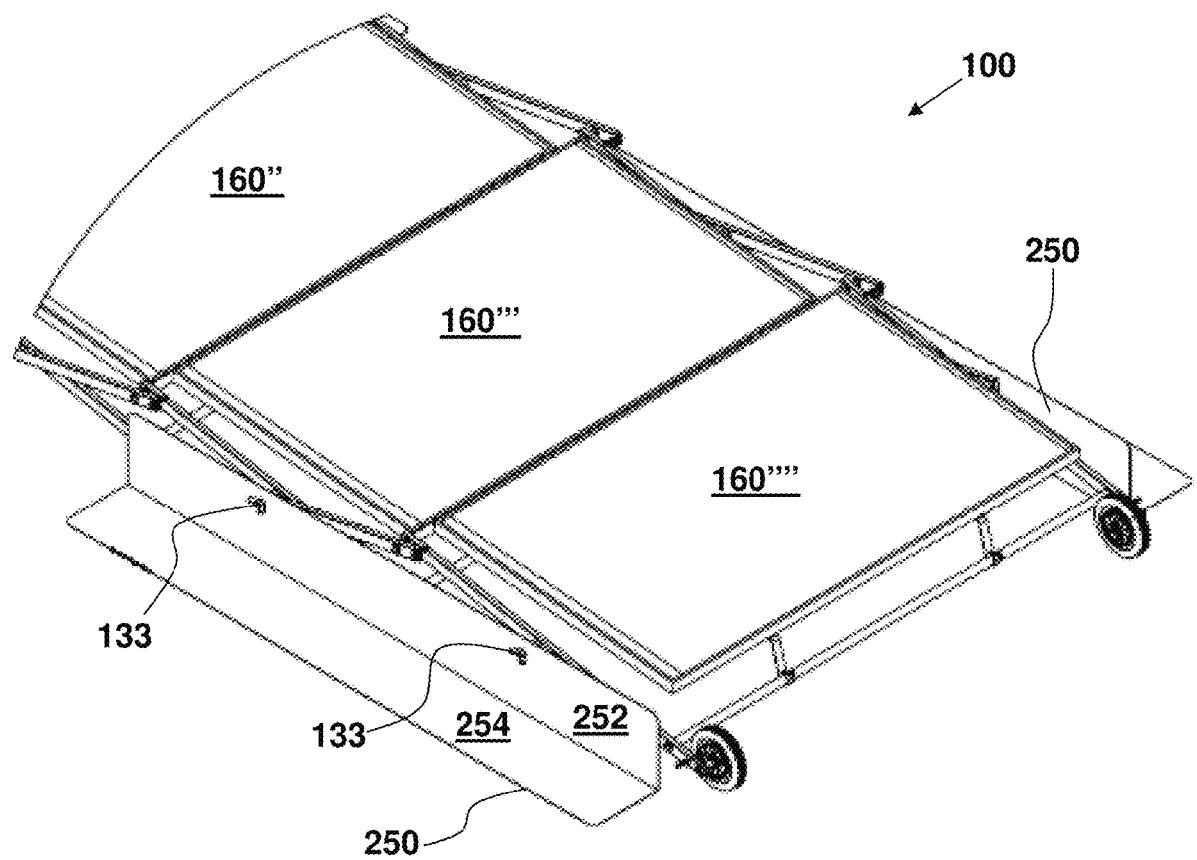
FIG. 16 is a fragmentary, perspective view of a distal portion of the solar panel array of FIG. 12 with an exemplary embodiment of side fairings and fairing connectors.

An exemplary solution to safely reduce wind load on the solar panels 160, 160', 160", 160''', 160'''' is to place one or more side fairings 250 on the outer edges of the solar panel array 100. When the solar panel array 100 is fully extended, as in FIG. 13, the pivot bosses 132, 132', 132", 132''', 132'''' all present along a single axis. Taking advantage of this structural detail, the pivot bosses 132, 132', 132", 132''', 132'''' can be made to extend to a larger width W2 (see FIG. 14), thereby providing connection points 133 for the fairing 250, a portion of which is shown in the enlarged view of FIG. 15 and, in particular, in FIGS. 18 to 22. The connection points 133 of the pivot bosses 132 can take any form. For example, as shown in FIG. 15, the pivot boss 132 can extend to a distance X from the side arm 130 and present a bore through which projects outwardly a distal threaded end of a bolt 135, the head of the bolt 135 being placed on the opposite side and resting against the inside surface of the side arm 130 facing the solar panel 160. A nut 137 is threaded onto the bolt from the outside vertical surface 252 of the fairing 250 and, when tightened, secures the fairing 250 to the solar panel array 100. For easy tightening, the nut 137 can be a wing nut (see, e.g., FIG. 20). The fairing 250 can be angled to present a surface that directs wind over the solar panel array 100 instead of under, for example, at an angle downwards and outwards from the connection point 133, or it can be aerodynamically curved to deflect the air flow over the solar panel array 100. Another exemplary embodiment of the fairing 250 is shown in FIGS. 16 to 18 and has an L-shape defining a vertical exterior surface 252 connected at a lower edge to a horizontal ballast surface 254. This shape does not need to be aerodynamically structured as it presents a shelf on which ballast (e.g., stones, bricks, weights) can be placed, the collective weight of which prevents wind from blowing under the solar panels 160 and, if some wind does pass under the solar panels 160, the weight of the ballast keeps the entirety of the solar panel array 100 grounded. The length of the fairing 250 does not need to extend along the entire side of the solar panel array 100. As shown in FIGS. 17 and 18, for example, each of the fairings 250 can be approximately 2.2 meters long and have an intermediate spacing of, for example, approximately 1.05 meters.

Figure 21:
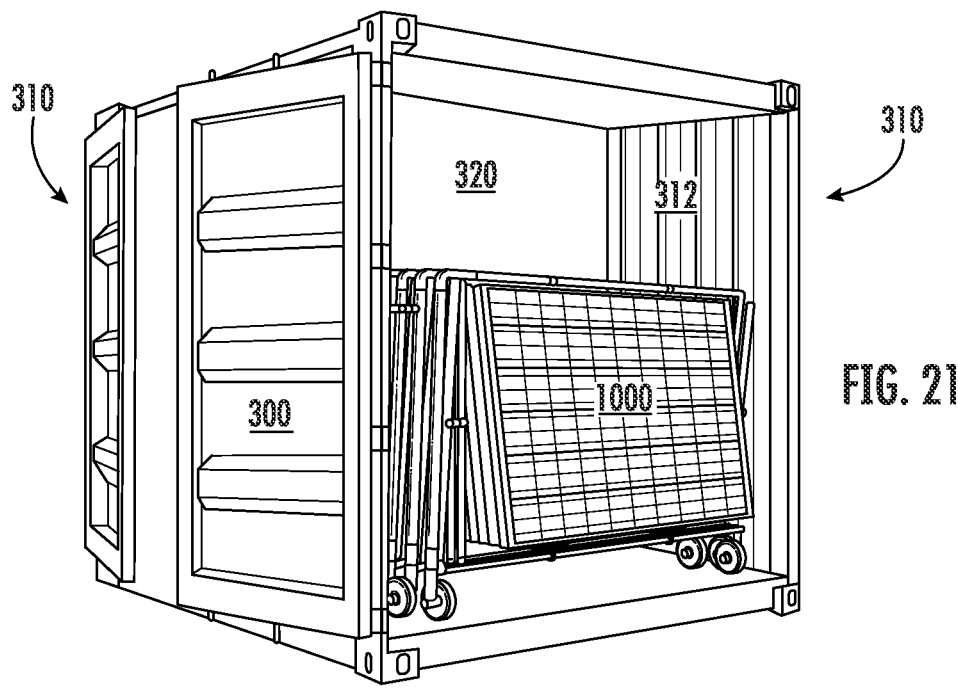
FIG. 21 is a perspective view of an exemplary embodiment of a solar power array installation having front and back compartments each containing a set of solar power arrays and viewed from a front right corner.
Figure 22:
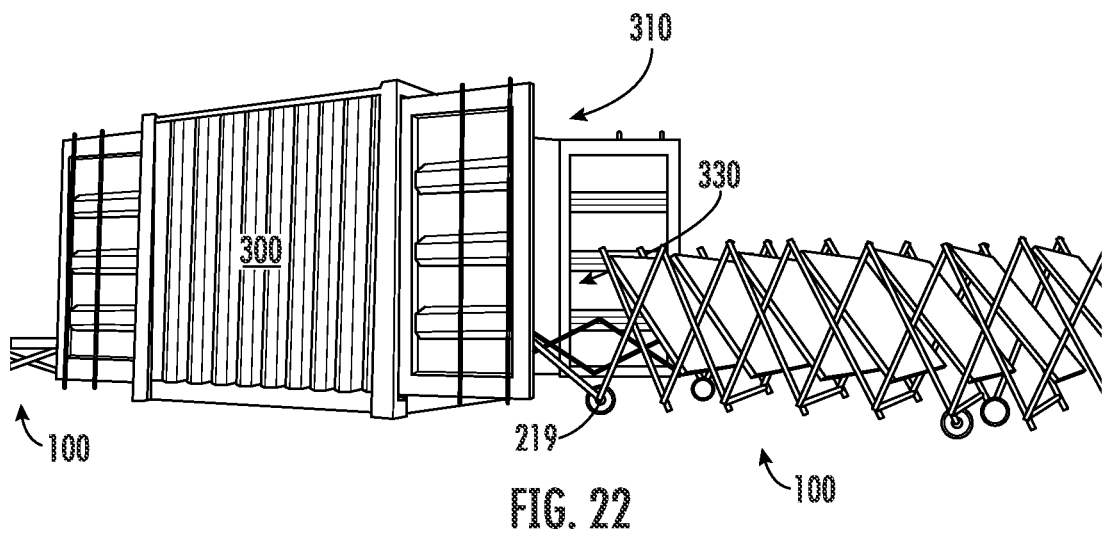
FIG. 22 is a fragmentary, perspective view of the solar power array installation of FIG. 21 viewed from the front right corner with the set of solar power arrays in the front compartment partially extended in an intermediate position and the set of solar power arrays in the rear compartment fully extended in a deployed position.
Figure 23:
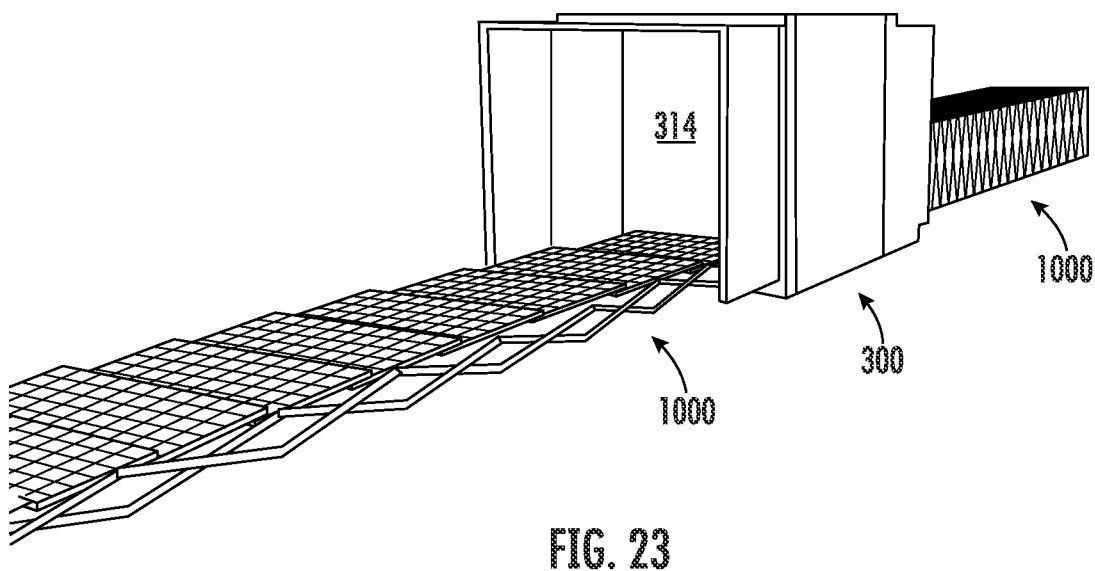
FIG. 23 is a fragmentary, perspective view of the solar power array installation of FIG. 21 viewed from the rear right corner with the set of solar power arrays in the front compartment partially extended in the intermediate position and the set of solar power arrays in the rear compartment fully extended in the deployed position.

The combined weight of the solar panel array 100 is also not insignificant, it is approximately 175 kg. With four wheels 138 for each solar panel array 100, whether in the collapsed position of FIG. 11 or in an intermediate expanded position, e.g., shown in FIG. 7, a user or at most two users can easily maneuver the solar panel array 100 about the environment. In a typical solar power generation facility, however, many more panels than five are required. In fact, dozens of panels are required to generate any significant amount of power. Accordingly, each solar panel array 100 is configured to attach to another solar power array 100 in a modular manner and, when so connected, to extend out along an array line and retract back along that array line. In particular, as shown in FIGS. 3 to 7, the lower portion of the proximal torsion subframe 200 (connected to the proximal solar panel frame 110) contains array connectors 219 that secure the first or proximal solar power array 100 to an array installation 300, such as the container portion shown in FIGS. 21 to 23. This exemplary embodiment of an array installation 300 is in the shape of a shipping container and has a length that is, for example, an integer fraction of a standard shipping container. For example, the longitudinal length can be 10' for ⅓ of a 30' shipping container or for ½ of a 20' shipping container. Even though the word "container" is used to include a trailer-truck shipping container, this word is not limited thereto. Any other structure that can contain the solar power arrays and systems described herein is equally applicable to the definition of container as it is used herein. This exemplary configuration of the array installation 300 is bi-directional, in that it has opposing openings 310 and, if desired, an interior cross-wall 320 can define front and back compartments 312, 314, each compartment 312, 314 containing a modular set 1000 of solar panel arrays 100. FIG. 21 shows the front compartment 312 containing therein the modular set 1000 in the collapsed position. The modular set 1000 in the front compartment 312 of FIG. 22 is shown in a partially expanded position with the array connectors 219 securing the proximal solar power frame 110 to an extending connector 330 of the front compartment 312 of the array installation 300. The set of solar panel arrays 100 in the rear compartment 314 of FIG. 22 (to the left of the figure) is shown in a fully extended position. FIG. 23 illustrates a view from the rear compartment 314 of the array installation 300. The left of FIG. 23 shows the rear set of solar panel arrays 100 in the fully extended position and the right of FIG. 23 shows the front set of solar panel arrays 100 in an intermediate extended position.

The five-frame solar panel arrays 100 are configured to form larger strings, for example, up to twenty-five or even thirty frames when connected together. As explained above, the direct connection between each solar panel array 100 is "broken" by using the shorter fifth side strut 210''''. Accordingly, the five-frame solar panel arrays 100 are connected together with a "semi-junction" that allows each five-frame solar panel array 100 to be unfolded/collapsed almost independently from one another. This is opposed to a five-by-five connection of twenty-five frames with no semi-junctions, which would lead to a massive 25-frame block that most likely cannot be manipulated by two or four strong users.

The solar panel arrays 100 are not limited to use in a modular set 1000. For smaller applications, for example, on a flat roof or for a single home, the solar panel arrays 100 (e.g., in the five-frame solar panel array configuration) can be used separately and in a mechanically unconnected manner. The solar panel arrays 100 can be connected electrically in any series or parallel configuration. Electrical extension cables known in the solar panel industry connect the solar panels to one another, connect the solar panel arrays 100 to one another, and connect the proximal solar panel array 100 to an electrical installation, such as the installation 300 shown in FIGS. 21 to 26. For clarity, such cables are not illustrated.

Figure 24:
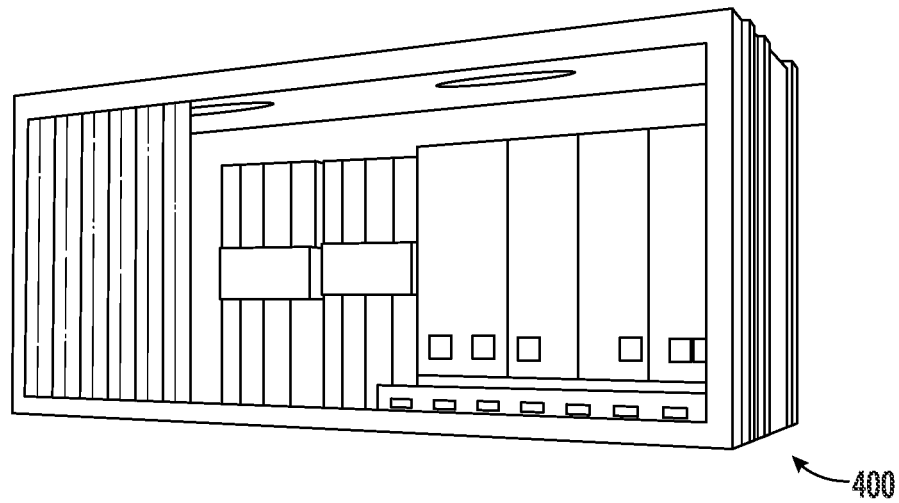
FIG. 24 is a perspective view of an exemplary embodiment of a stand-alone, portable power regulation, distribution, and storage device.
Figure 25:
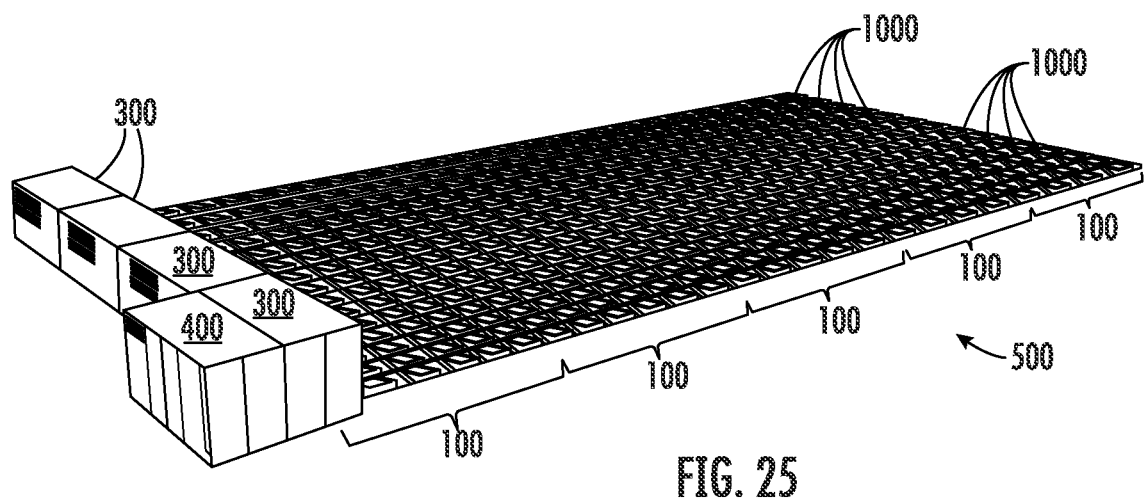
FIG. 25 is a perspective view of an exemplary embodiment of portable, solar power generation facility having a stand-alone, portable power regulation, distribution, and storage device connected to four array installations, each array installation having four sets of solar power arrays, each set of solar power arrays having twenty-five solar panels with the solar panel arrays in a fully extended position.
Figure 26:
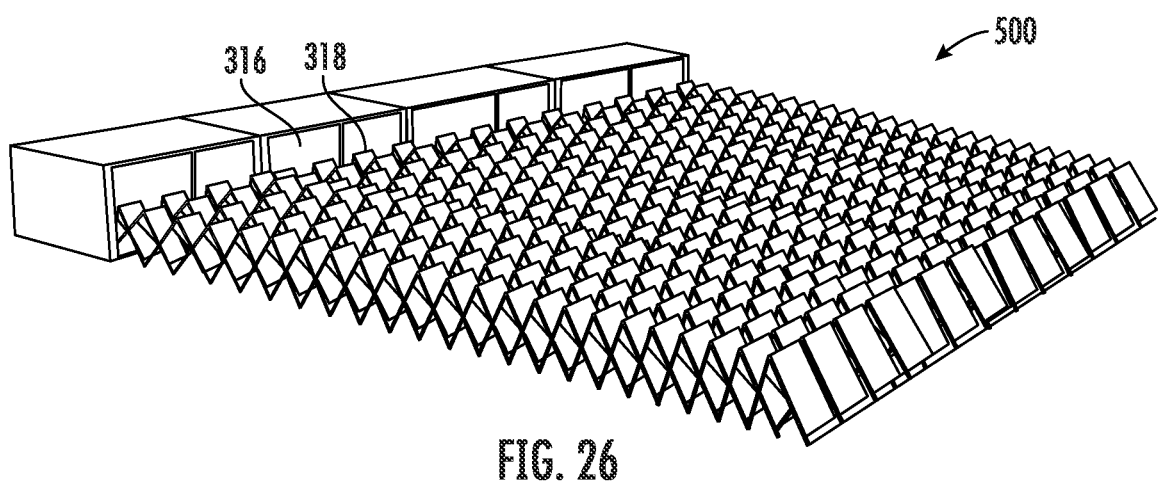
FIG. 26 is a perspective view of the portable, solar power generation facility of FIG. 25 with the solar panels arrays in an intermediate extended position.

When one or more array installations 300 are used to generate power at a location, storage and/or regulation of the power that is generated by the solar panel arrays 100 is needed. Companies have created stand-alone, portable power regulation, distribution, and storage devices, which are referred to as microgrids. For example, ABB has created various sized microgrid devices under the trade name PowerStore™ (see http://new.abb.com/microgrids/our-offering/powerstore-battery). A 10' ABB microgrid controller is designed for installations having a power requirement of 50 to 60 kW and desiring 4 to 8 hours of backup power. In an exemplary configuration, this 10' microgrid can be connected to a 10' array installation 300 to form a 20' container that is easily transported by a single truck. ABB also provides a 20' microgrid station for installations having a power requirement below 200 kW. Such a controller can be combined with two 10' array installations 300 that are easily transportable on two trucks or a single tandem semi-truck. FIG. 24 illustrates a stand-alone 20' PowerStore™ controller 400 that has a battery for storage and backup power, an HVAC unit for maintaining the controller at a desired internal temperature, and a power conversion system for safe distribution of the stored and generated power. FIGS. 25 and 26 illustrate a large, portable, solar power generation facility 500 combining four 20' array installations 300 with a 20' power storage and distribution controller 400. Each of the array installations 300 have left and right compartments 316, 318 with each containing therein two sets 1000 of solar panel arrays 100. Each modular set 1000 contains five solar panel arrays 100. Accordingly, in the configuration of FIGS. 25 and 26, the facility 500 deploys eighty solar panel arrays 100 containing a total of four-hundred power-generating solar panels 160. FIG. 26 illustrates the modular sets 1000 partially extended in an intermediate unfolding position and FIG. 25 illustrates the four-hundred solar panels 160 in a fully extended position ready for unobstructed receipt of solar energy.

FIGS. 27 to 32 illustrate another exemplary embodiment of a solar panel array 600 with three solar panel instances (proximal 601, intermediate 602, distal 603). FIG. 27 shows the solar panel array 600 in a fully extended position, FIG. 28 shows the solar panel array 600 in an intermediate extended position, and FIG. 29 shows the solar panel array 600 in a fully collapsed position. This embodiment is similar to the embodiments described herein and all of the description above is incorporated by reference herein. Where similar features appear, similar numbering may apply but the numbering should not be construed as requiring indenticality of form or function. All equivalent and alternative features are equally applicable to each feature. In the closed or collapsed position of the solar panel array 600, the portable, retractable, solar racking system comprises a pivoting connector assembly mechanically connecting one of the solar panel frames to another one of the solar panel frames to form a solar panel array having a longitudinal extent and this pivoting connector assembly is able to collapse the solar panel array along the longitudinal extent into a volume-minimized storage position and expand the solar panel array along the longitudinal extent into an extended position in which each solar panel is tilted from substantially vertical to an angle away from vertical.

Figure 30:
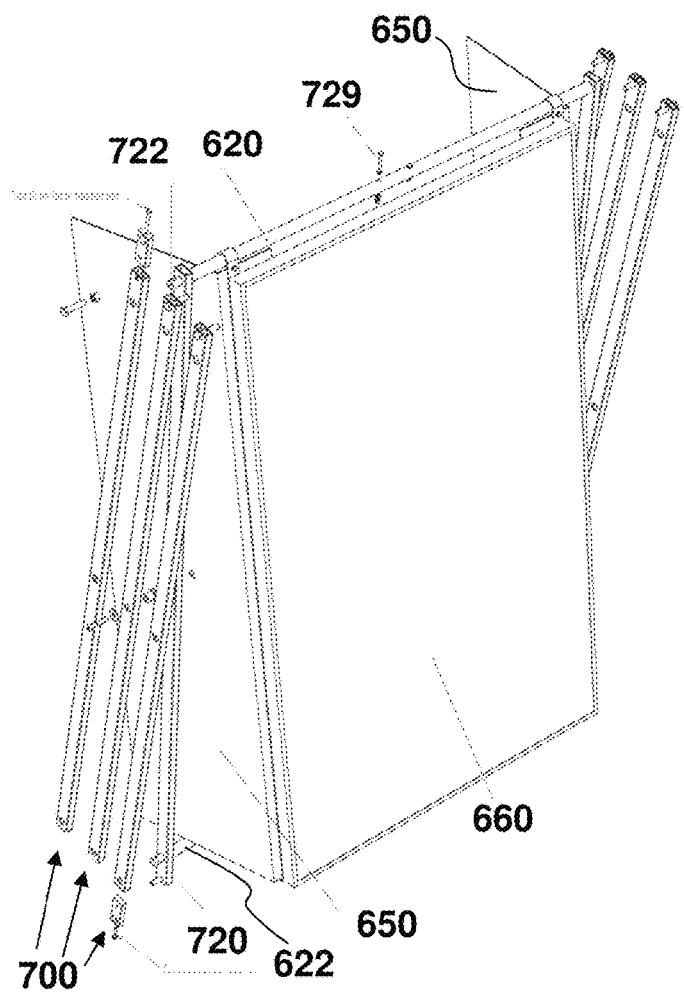
FIG. 30 is an exploded, perspective view of a portion of the solar panel array of FIG. 27.

Each of the three solar panel instances 601, 602, 603 of the solar panel array 600 includes a solar panel frame 610 and a set of two opposing torsion subframes 700. A pivoting connector assembly that connects one solar panel instance to another comprises the subframes 700. The solar panel frame 610 is shaped to holding a single photovoltaic panel 660. Each solar panel frame 610 comprises upper and lower horizontal struts 620, 622 (e.g., round tubes) connected to two vertical side arms 630 that can be, for example, rectangular solid bars or rectangular hollow tubes. In this exemplary embodiment, the struts 620, 622 and arms 630, when connected together, form a rectangle to fit therein a rectangular photovoltaic panel 660. This shape is merely one example and can be, for example, square. This shape is also contrasted to the shape of the solar panel array 100, which holds the solar panels 160 in landscape (width>height), where the solar panel frame 610 holds the solar panels 660 in portrait (height>width). The connections of the tubes 620, 622 to the side arms 630 in the solar panel frame 610 is a fixed connection. Each vertical side arm 630 of the solar panel frame 610 has a hollow lower bore in which the one end of the lower round tube 622 is secured respectively. As shown in FIG. 30, this bore is sized to rotatably fit a lower torsion bar 720 therethrough and, because the hollow is open to the exterior, passage of the lower torsion bar 720 into the hollow of the lower round tube 622 is permitted. The lower round tube 622 also is connected to the side arms 630 at distance above a lower end of the side arms 630. This connection, therefore, creates a lower extent 634 at each of the side arms 630 as shown, for example, in FIG. 28. An exterior pivot boss 632 projects from a midpoint of the side arms 630 away from an outside surface of each side arm 630. A stop pin 636 projects from the outside surface of the side arms 630 at the lower extent 634. The stop pin 636 can be attached to the lower extent 634 in any number of ways, for example, by welding, brazing, soldering, or with an adhesive, or it can have a lower screw that turns the stop pin 636 into the material of each side arm 630. A wheel 638 is rotatably connected to a lowest portion of each of the lower extents 634 of the solar panel instances 601, 603. The wheel 638 is positioned on interior side of the side arms 630 to permit expansion of the solar panel array 600 along an array line and to permit retraction into a smallest possible contracted position for storage, for example, one that is minimized in terms of volume.

Each of the torsion subframes 700 has a vertical side strut 710. The lower torsion bar 720 is fixed to a lower end of each of the side struts 710 and projects in an inwards direction. An upper torsion bar 722 is fixed to an upper location of each of the side struts 710 at a distance from an upper end of the side strut 710 to form an upper extent 716 of the side strut 710 (see FIG. 32), the upper torsion bar 722 similarly projecting in the inwards direction. A stop pin 717 projects from an inside surface of the side strut 710 at the upper extent 716 as shown in FIG. 32. The stop pin 717 can be attached to the upper extent 716 in any number of ways, for example, by welding, brazing, soldering, or with an adhesive, or it can have a lower screw that turns the stop pin 717 into the material of each side strut 710. A pivot port is positioned at a midpoint of the side strut 710 and is sized to fit the pivot boss 632 therein securely so that the side strut 710 can rotate freely about the axis of the pivot boss 632.

Figure 31:
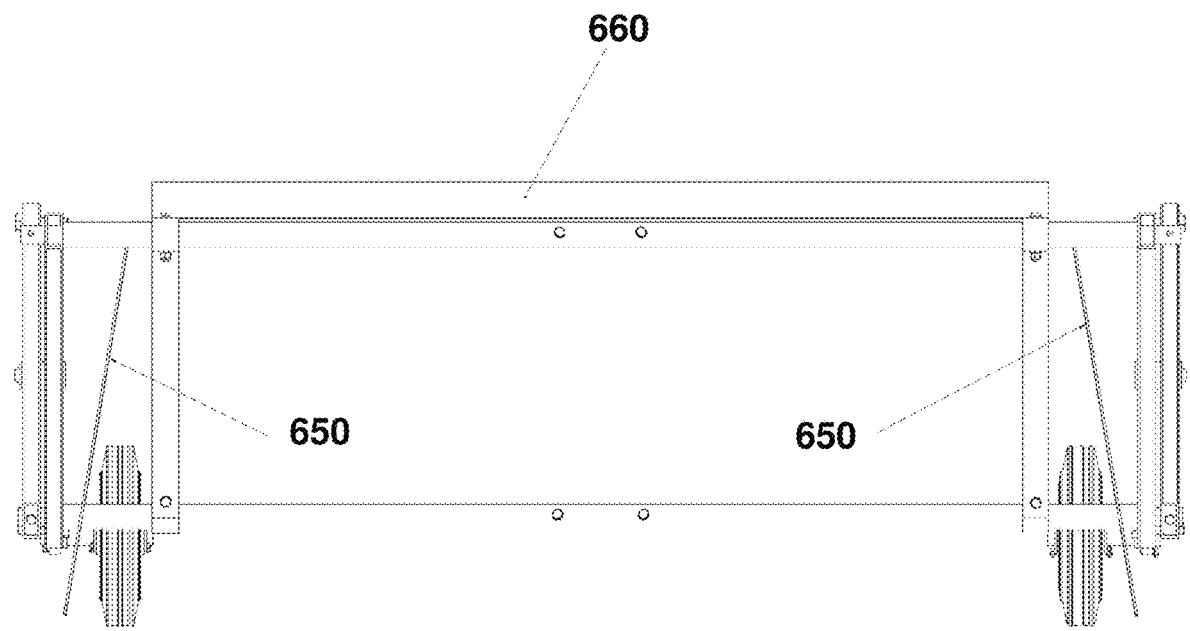
FIG. 31 is a front side elevational view of a distal end of the solar panel array of FIG. 27.

As mentioned above, wind can be an issue with respect to the solar panel array 600. Accordingly, a fairing 650 is attached to each of the opposing sides of the solar panel 660. In this exemplary configuration of the fairing 650, the fairing 650 is angled downwards and outwards from the solar panel 660 to present a surface that directs wind over the solar panel array 600 instead of under as shown in FIG. 31. In this exemplary embodiment, the fairings 650 are able to nest within one another when the solar panel array 600 is in the collapsed position, as shown in FIG. 29. Also, the length of the fairing 650 extends along the entire side of the solar panel array 600. As shown in FIGS. 27 to 30, for example, each of the fairings 250 can be the same length as the sides of the solar panels 660.

Alternatively, the fairing 650 can be attached to the pivot boss 632 (as described in the embodiments above) and aerodynamically curved to deflect the airflow over the solar panel array 600. A further exemplary embodiment of the fairing 650 can be the shape shown in FIGS. 16 to 18, which has an L-shape defining a vertical exterior surface 252 connected at a lower edge to a horizontal ballast surface 254. In this L-configuration, the length of the fairing 650 does not need to extend along the entire side of the solar panel array 600. As shown in FIGS. 17 and 18, for example, each of the fairings 650 can be 2.2 meters long and have an intermediate spacing of, for example, 1.05 meters.

As set forth above, one exemplary configuration of the solar panels 160, 660 has the extension strut 123 at a length to align the solar panels 160, 660 in a single plane or coplanar, referred to herein as an array plane. When such a solar panel array 100, 600 is in a fully extended/open position, such as shown in FIGS. 12, 25, and 27, the solar panels 160, 660 are substantially and relatively parallel to ground. In such a configuration, optimal exposure of the Sun to the solar panels is orthogonal to the solar panels, which means that the Sun should be directly overhead. In many locations where the instant systems are used, however, the Sun is not typically directly overhead. In fact, in all locations on the Earth, the Sun will not be directly overhead for most of the year, which, as is known, is due to the Earth's axial tilt. Accordingly, it would be desirable to tilt the array plane 801 with respect to ground so that the orthogonal axes 802 of the solar panels 160 point at the Sun (see, e.g., FIG. 42) to, thereby, receive the Sun's rays 803 optimally. Because the Sun can be at a different angle to ground on any given day, it would be desirable to provide the solar panels with an ability to vary the orthogonal axis so that adjustment can be made to provide optimal exposure. The exemplary embodiments of the solar panel array 800 shown in FIGS. 33 to 53 provides such features.

Figure 33:
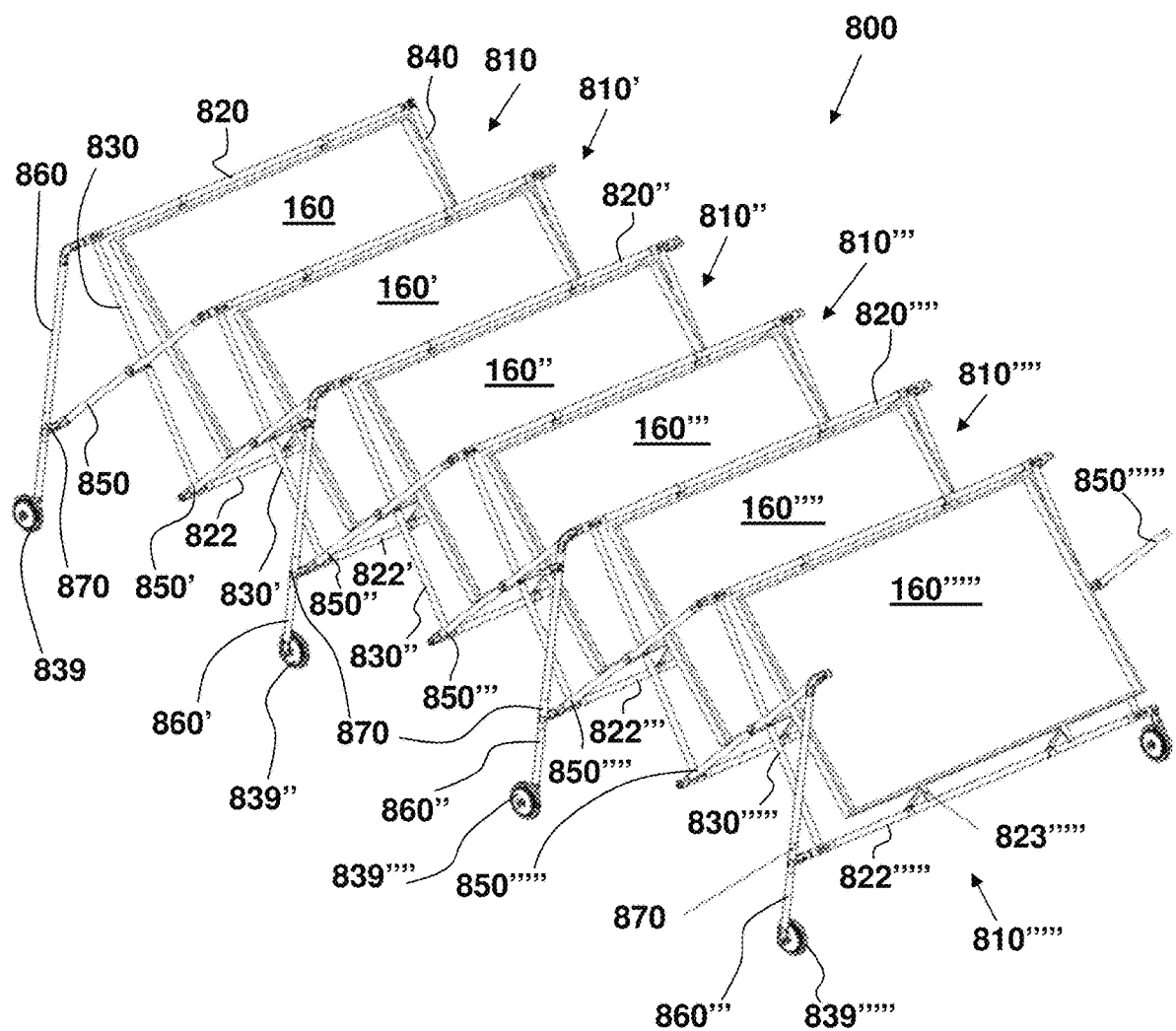
FIG. 33 is a perspective view of an exemplary embodiment of a solar panel array in an intermediate extended position and having six solar panel instances.
Figure 34:
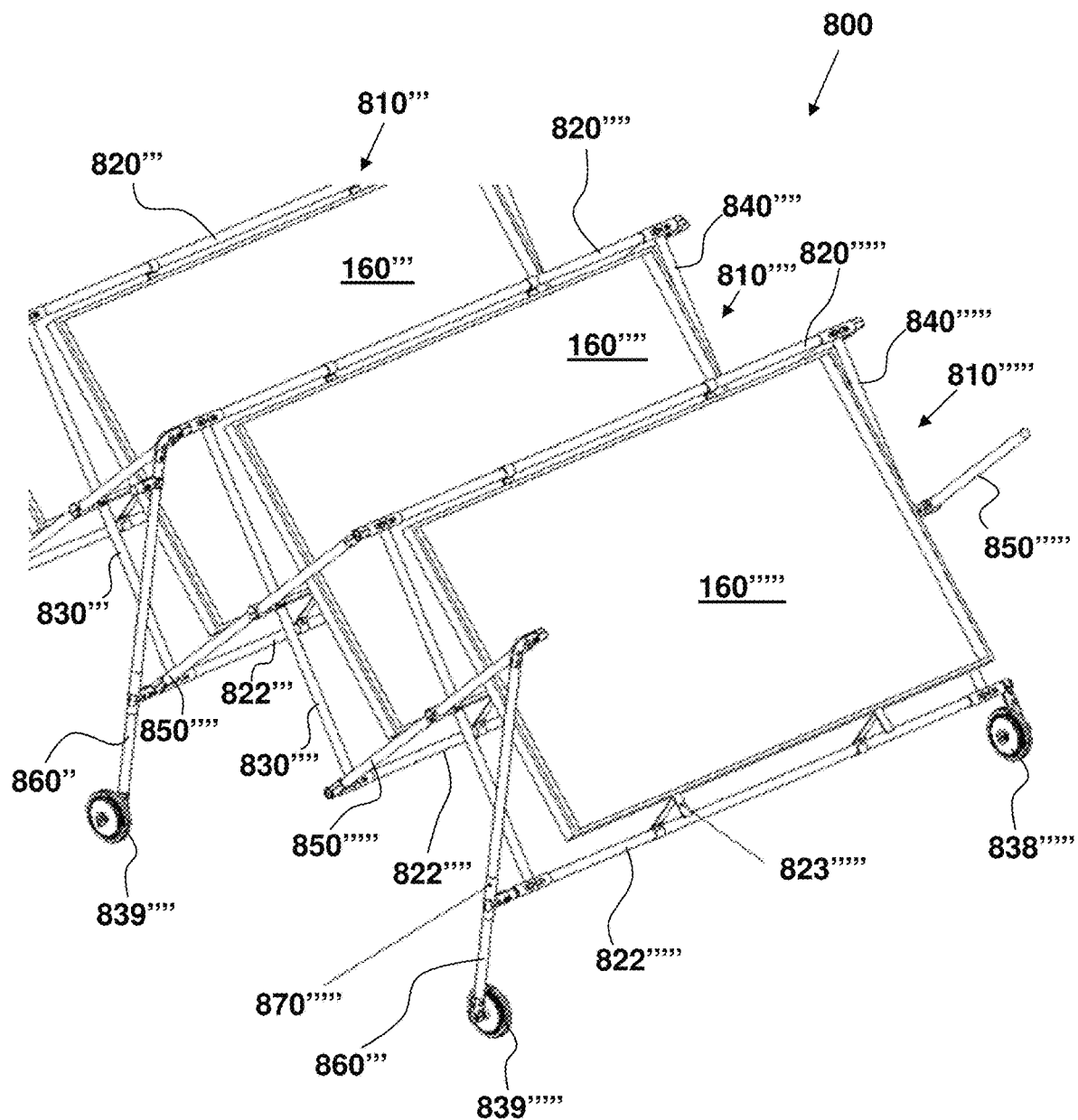
FIG. 34 is a fragmentary, enlarged, perspective view of a distal portion of the solar panel array of FIG. 33.

Before illustrating the individual parts of the solar panel array 800, FIGS. 33 and 34 illustrate a six-panel configuration having an external structure that allows the solar panel array 800 to move from a closed configuration (shown, e.g., in FIGS. 35 and 37), where the upper and lower frame struts 820, 822 are parallel to ground, to an open configuration (shown, e.g., in FIGS. 41 and 42), where the upper and lower frame struts 820, 822 (also referred to as upper and lower frame tubes) are at an angle Δ to ground, in particular, between approximately 10 degrees and approximately 40 degrees, in particular, between approximately 20 degrees and approximately 40 degrees, further, between approximately 25 degrees and approximately 35 degrees, and, particularly, at approximately 30 degrees. The closed, stored, or collapsed position is referred to herein for various embodiments of the solar panel array. In the closed position of the solar panel array 800, a portable, retractable, solar racking system comprises a pivoting connector assembly mechanically connecting one of the solar panel frames to another one of the solar panel frames to form a solar panel array having a longitudinal extent and this pivoting connector assembly is able to collapse the solar panel array along the longitudinal extent into a volume-minimized storage position and expand the solar panel array along the longitudinal extent into an extended position in which each solar panel is tilted from substantially vertical to an angle away from vertical. The pivoting connector assembly of each of the solar panel frames is further configured to expand and contract the solar panel array between a closed configuration in which the orthogonal axis of the solar panel is substantially parallel to the longitudinal extent and the upper frame strut and the lower frame strut are substantially parallel to one another and are substantially parallel to ground with the upper frame strut disposed above the lower frame strut to define a first plane being substantially vertical and substantially orthogonal to the longitudinal extent and an open configuration in which the upper and lower frame struts are parallel to one another and not parallel to ground to define a second plane that is at a given angle to ground to place the orthogonal axis of the solar panel at the given angle from vertical. The given angle to ground is between approximately 10 degrees and approximately 40 degrees, further, between approximately 25 degrees and approximately 35 degrees, in particular approximately 30 degrees. The pivoting connector assembly of each of the solar panel frames is configured to expand and contract the solar panel array to an open configuration in which the first plane is rolled approximately ninety degrees and pitched to a given angle to ground to place the orthogonal axis of the solar panel at the given angle from vertical and thereby orient the orthogonal axis to point towards the Sun. The pivoting connector assembly is configured to expand the solar panel array longitudinally into an extended position in which each solar panel is tilted from substantially vertical to an angle away from vertical such that adjacent ones of the solar panels do not overlap when facing the sun to an extent that would place shadow from one of the solar panels onto another one of the solar panels. The angle is at least approximately 45 degrees away from vertical, further, at least approximately 60 degrees away from vertical, in particular, approximately 90 degrees away from vertical. The pivoting connector assembly is configured to expand the solar panel array longitudinally into an extended position in which each solar panel is tilted from substantially vertical to substantially coplanar with each of the other solar panels.

Each solar panel instance of the solar panel array 800 comprises a solar panel frame 810 having an upper frame strut 820, a lower frame strut 822, a left side arm 830, and a right side arm 840. As in previous exemplary embodiments, the solar panel 160 is connected at the upper frame strut 820 by a clamp 821 and at the lower frame strut 822 by an extension strut 823, and a first wheel 838 is located at a right end of the lower frame strut 822, here, projecting away from the lower end of the right side arm 840. These first wheels 838 are shown, e.g., in FIGS. 37, 41, and 43. To maximize the ability of the solar panel array 800 to collapse into the closed orientation, the first wheels 838 are staggered on opposing sides of a hub that extends slightly outwards and downwards from the intersection of the lower frame tube 822 and the right side arm 840. In contrast to previous embodiments, the opposing second wheel 839 is not located at the opposite end of the lower frame tube 822 but, rather, is at a bottom end of each extension strut or tube 860 as shown, e.g., in FIGS. 33 to 35 and explained in further detail below. As above, the words "strut" and "tube" are used interchangeably. "Strut" and "tube" both refers to the structure in general but, where the feature is a tube in the exemplary embodiments shown in the drawing figures, then the word tube is used. Therefore, both "strut" and "tube" are used here in a broad sense and are not limited to the exemplary cylindrical structure depicted but also refer to other equivalent structures.

To connect the solar panel frame 810 (comprising struts 820, 822 and side arms 830, 840) to form the solar panel array 800, a set of opposing left and right connector struts or tubes 850 are provided. A pivoting connector assembly that connects one solar panel frame to another comprises the connector struts 850. In this regard, the top ends of the left and right connector struts 850 are pivotally connected to the respective left and right ends of the upper frame strut 820 of a distal panel frame 810 and the bottom ends of the left and right connector struts 850 are pivotally connected to the respective left and right ends of the lower frame strut 820 of a proximal panel frame 810. In a first example shown in FIG. 34, the upper end of the left connector tube 850'''' (the second to last one in this array) is pivotally connected to the left end of the upper frame tube 820'''' of the sixth solar panel frame 810''''' and the lower end of the left connector tube 850'''' is pivotally connected to the bottom end of the left side arm 830''' of the fourth solar panel frame 810''', which bottom end of the left side arm 830''' is pivotally connected to the left end of the lower frame tube 822''' of the fourth solar panel frame 810'''. In a second example shown in FIG. 34, the upper end of the last left connector tube 850''''' in the array is pivotally connected only to the top end of the last extension tube 860''''' (which is connected pivotally to the sixth solar panel frame 810''''') and the lower end of the last left connector tube 850''''' is pivotally connected to the bottom end of the left side arm 830'''' of the fifth solar panel frame 810'''', which bottom end of the left side arm 830'''' is pivotally connected to the left end of the lower frame tube 822'''' of the fifth solar panel frame 810''''.

The extension tubes 860, 860', 860'', 860''' are connected at various points on the left exterior ends of some of the six panel instances comprising the solar panel array 800. A top end of a proximal extension tube 860 (i.e., of the first panel instance) is connected pivotally to the left end of the upper frame tube 820 of the first panel frame 810 and a bottom end of the proximal extension tube 860 is pivotally attached to a left bottom end of the proximal left connector tube 850, which left bottom end is not connected to any of the solar panel frames. A top end of a second extension tube 860' is connected pivotally to a top end of the second left connector tube 850', which top end of the second left connector tube 850' is pivotally connected to the left end of the upper frame tube 820'' of the third solar panel frame 810''. The bottom end of the second extension tube 860' is pivotally and slidably connected to a bottom end of the third left connector tube 850'', which bottom end of the third left connector tube 850'' is pivotally connected to the left end of the lower frame tube 822' of the second solar panel frame 810'. A top end of a third extension tube 860'' is connected pivotally to a top end of the fourth left connector tube 850''', which top end of the fourth left connector tube 850''' is pivotally connected to the left end of the upper frame tube 820'''' of the fifth solar panel frame 810''''. The bottom end of the third extension tube 860'' is pivotally and slidably connected to a bottom end of the fifth left connector tube 850'''', which bottom end of the fifth left connector tube 850'''' is pivotally connected to the left end of the lower frame tube 822''' of the fourth solar panel frame 810'''. Finally, a top end of a distal extension tube 860''' is connected pivotally to a top end of the sixth left connector tube 850''''', which top end of the sixth left connector tube 850''''' is not connected to a solar panel frame. The bottom end of the distal extension tube 860''' is pivotally and slidably connected to a left end of the lower frame tube 822''''' of the sixth solar panel frame 810'''''. The exemplary embodiment of the solar panel array 800 depicts four extension tubes 860, 860', 860'', 860'''. This amount is not to be considered as limiting. Fewer or a greater number of extension tubes 860 can be provided on the solar panel array 800. For example, six extension tubes 860 can be provided in an alternative exemplary embodiment.

Figure 35:
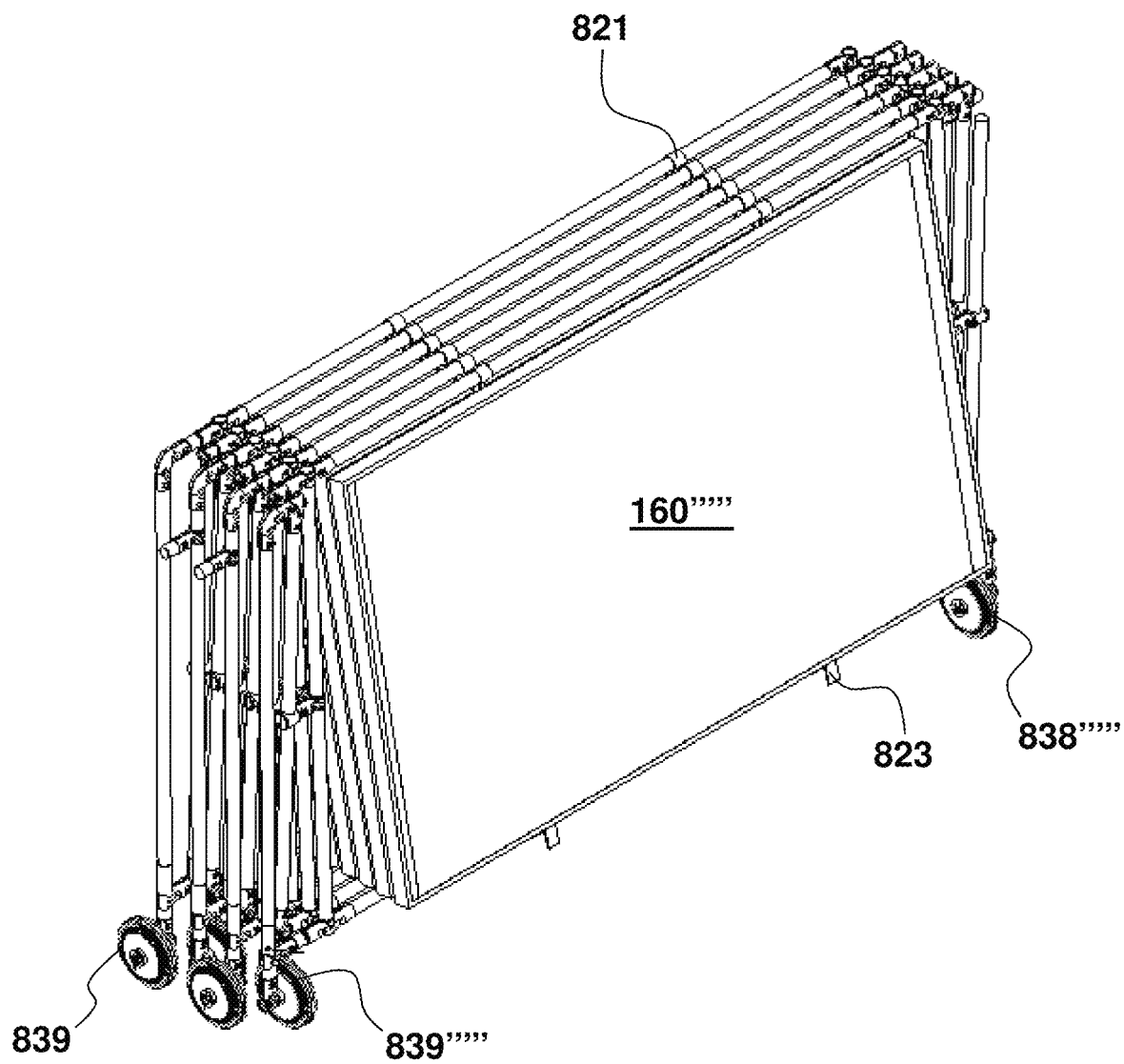
FIG. 35 is a perspective view of the solar panel array of FIG. 33 in a closed state.
Figure 36:
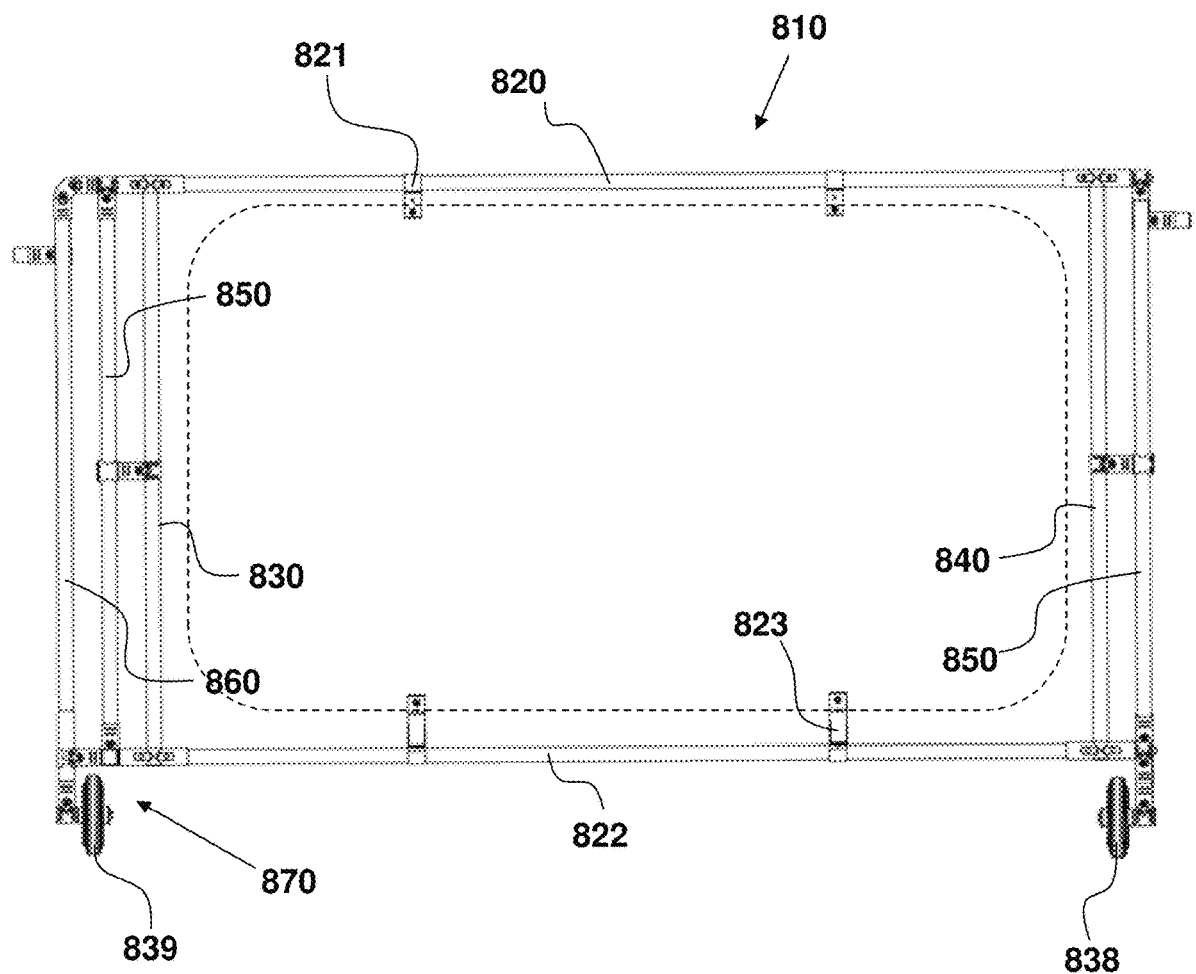
FIG. 36 is a plan view of the solar panel array of FIG. 35 viewed from a distal end thereof with the solar panel shown in dashed lines.
Figure 37:
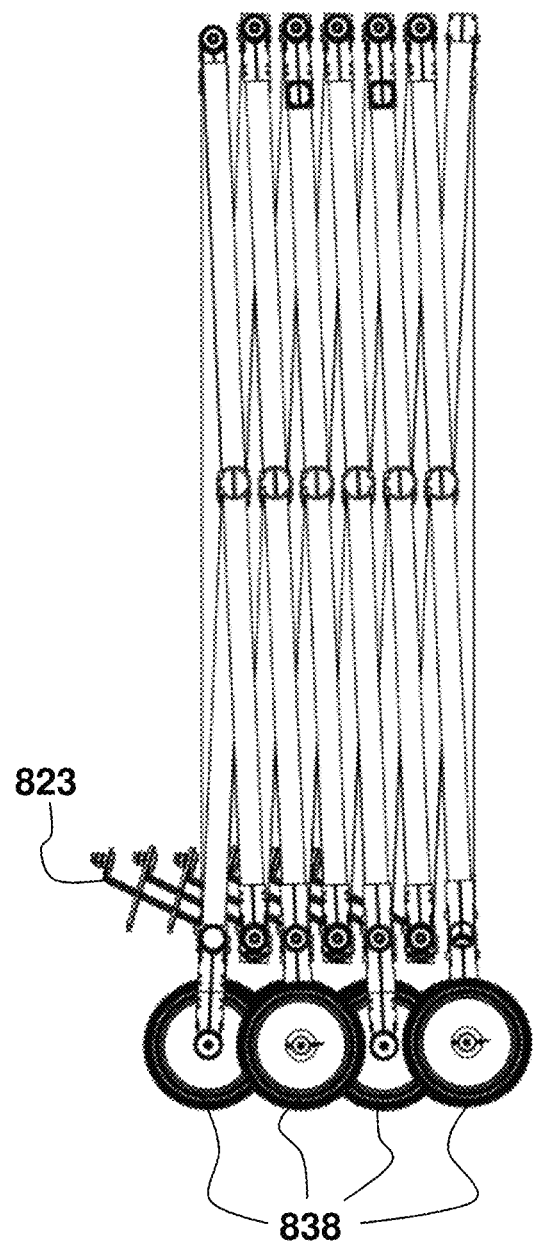
FIG. 37 is a left side elevational view of the solar panel array of FIG. 35 with the solar panels removed.
Figure 38:
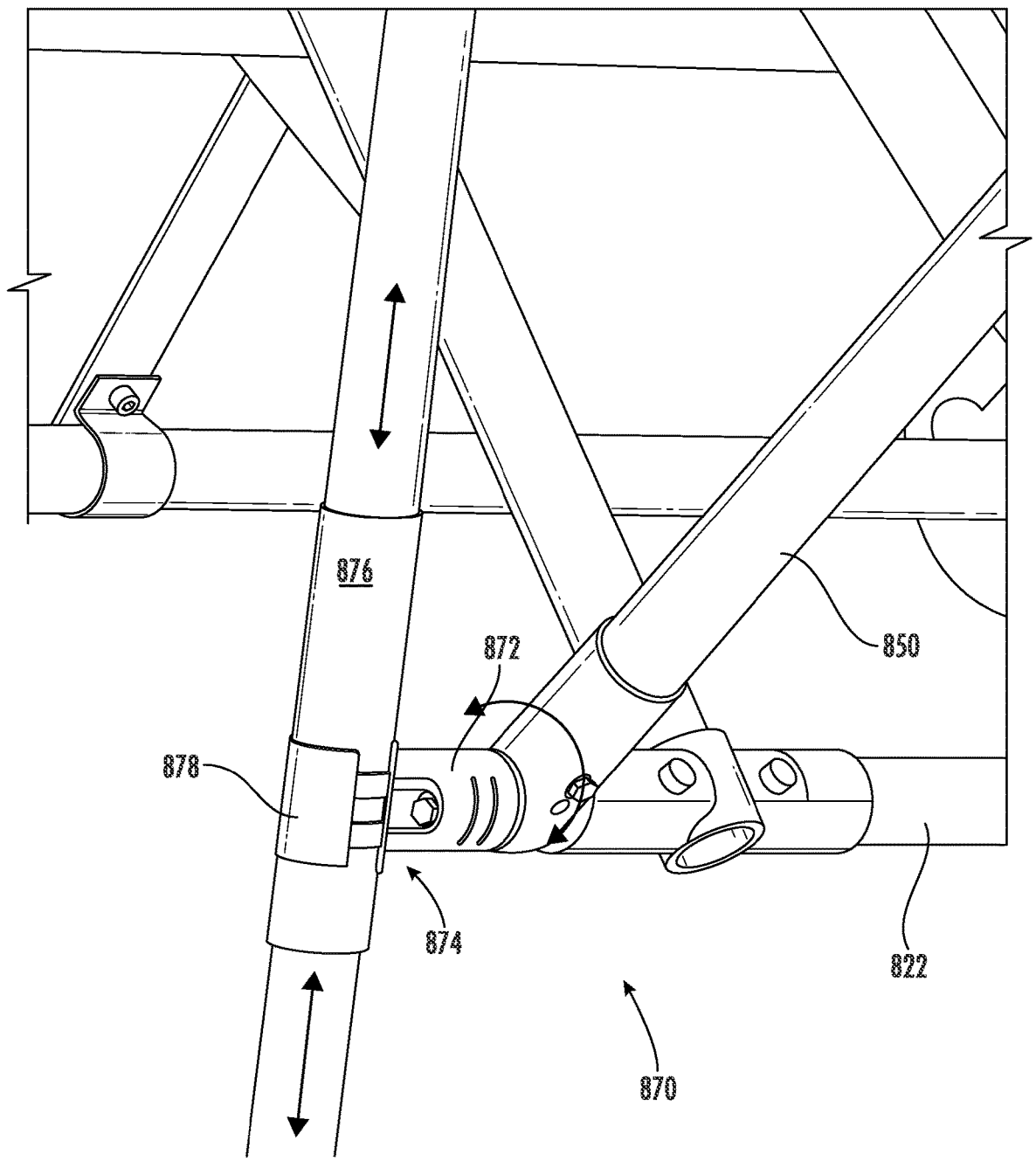
FIG. 38 is a fragmentary, enlarged, perspective view of an exemplary embodiment of a sliding pivot assembly of the solar panel array of FIG. 33.
Figure 41:
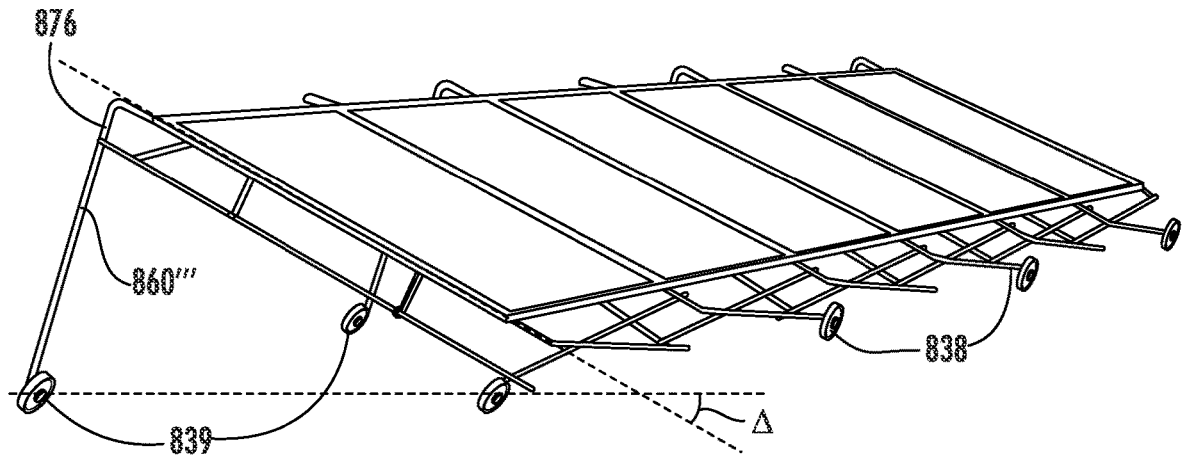
FIG. 41 is a perspective view of the solar panel array of FIG. 33 in an opened state.
Figure 42:
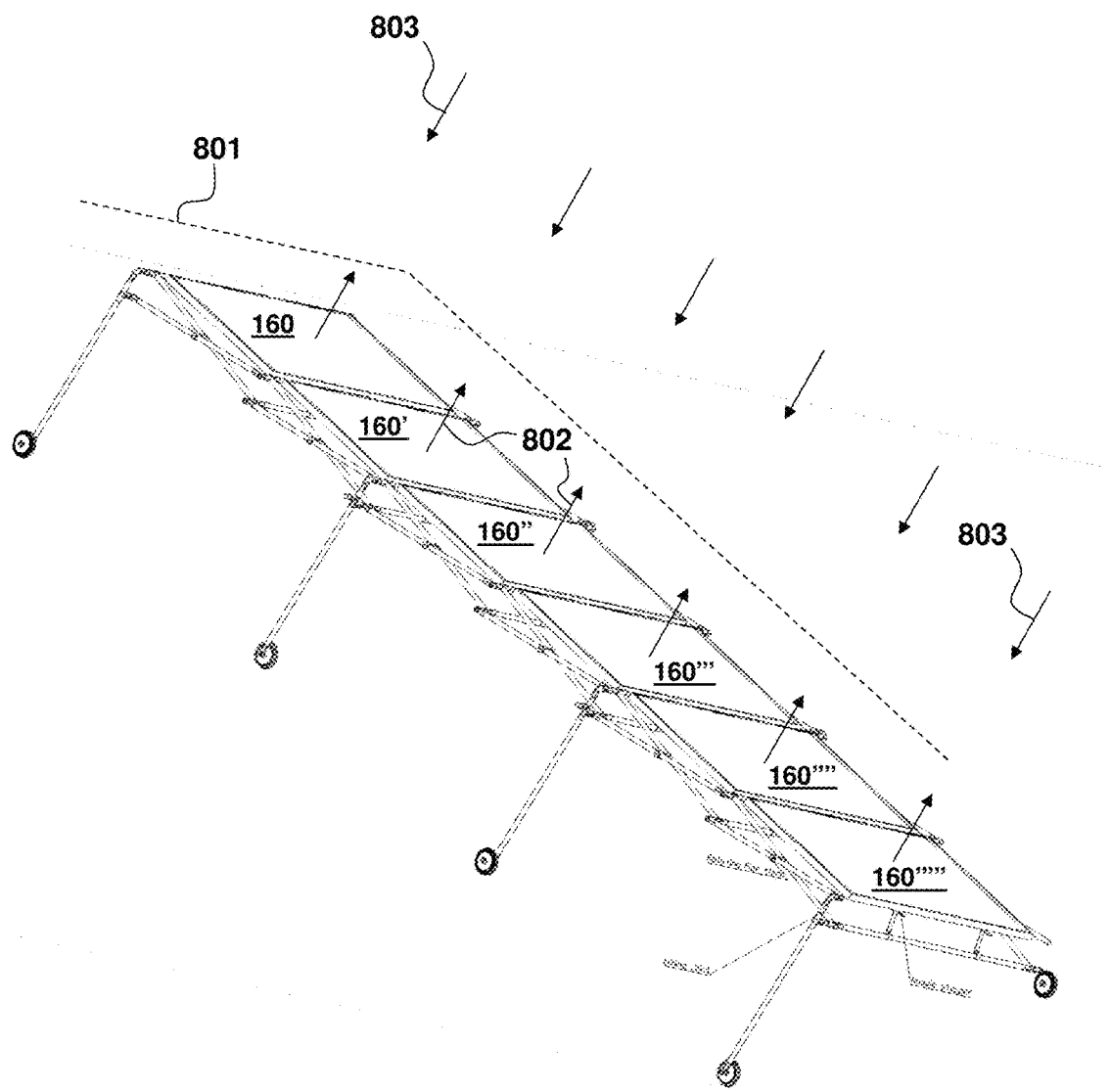
FIG. 42 is a perspective view of the solar panel array of FIG. 40 with the solar panels removed.

As set forth above, the bottom ends of the extension tubes 860 are not just pivotally connected to the lower frame tubes 822 so that the solar panel frames 810 within the array 800 can pivot from vertical (as shown in FIGS. 35 to 37) to horizontal (as shown in FIGS. 41 and 42). There is an additional feature that forms this lower connection between each extension tube 860 and its corresponding solar panel frame 810, which connection is referred to as a sliding pivot assembly 870. As shown in the detail of FIG. 38, the sliding pivot assembly 870 has a pivoting/rotating connector 872 attached to an outer side of the left connector tube 850. This pivoting connector 872 allows the solar panel frames 810 to pivot from vertical to horizontal as the extension tubes 860 remain substantially upright (upright being defined by each extension tube remaining in a plane comprising a set of the extension tube and the upper and lower frame tubes to which that extension tube is connected and only tilting within this plane). At the distal/outer end of the pivoting connector 872 is a slider 874 comprising two parts, a slide tube 876 and a slide clamp 878. The slide clamp 878 is rotationally fixed at the outer end of the pivoting connector 872 and defines an internal orifice in which the slide tube 876 resides. The slide clamp 878 is tightened around the slide tube 876 so that the slide tube 876 does not move within the orifice during opening/closing of the array 800 (the slide tube 876 can alternatively or additionally be fixed to the slide clamp 878, for example, by an adhesive). The interior of the slide tube 876 is made to be substantially frictionless so that the extension tube 860 is able to slide within the slide tube 876 without moving the slide tube 876 with respect to the slide clamp 878. There is, however, at least a minimum amount of friction, the amount of friction being dependent upon the materials used for the slide tube 876 and the extension tube 860.

Figure 39:
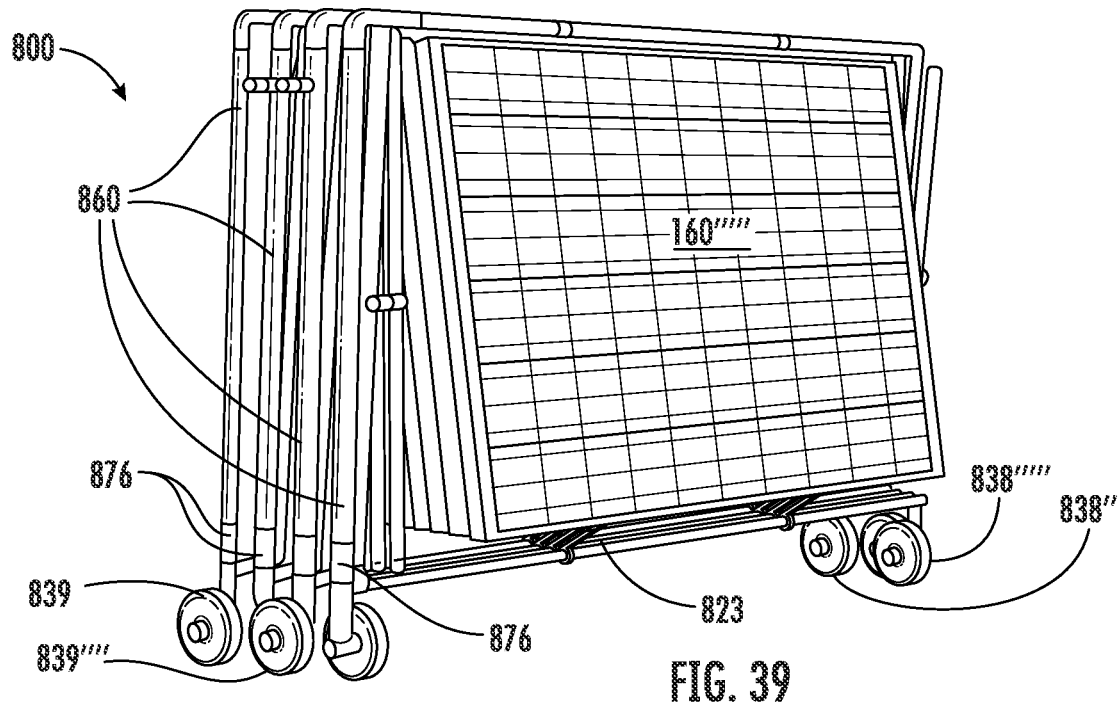
FIG. 39 is a perspective view of the solar panel array of FIG. 33 in a closed state.
Figure 40:
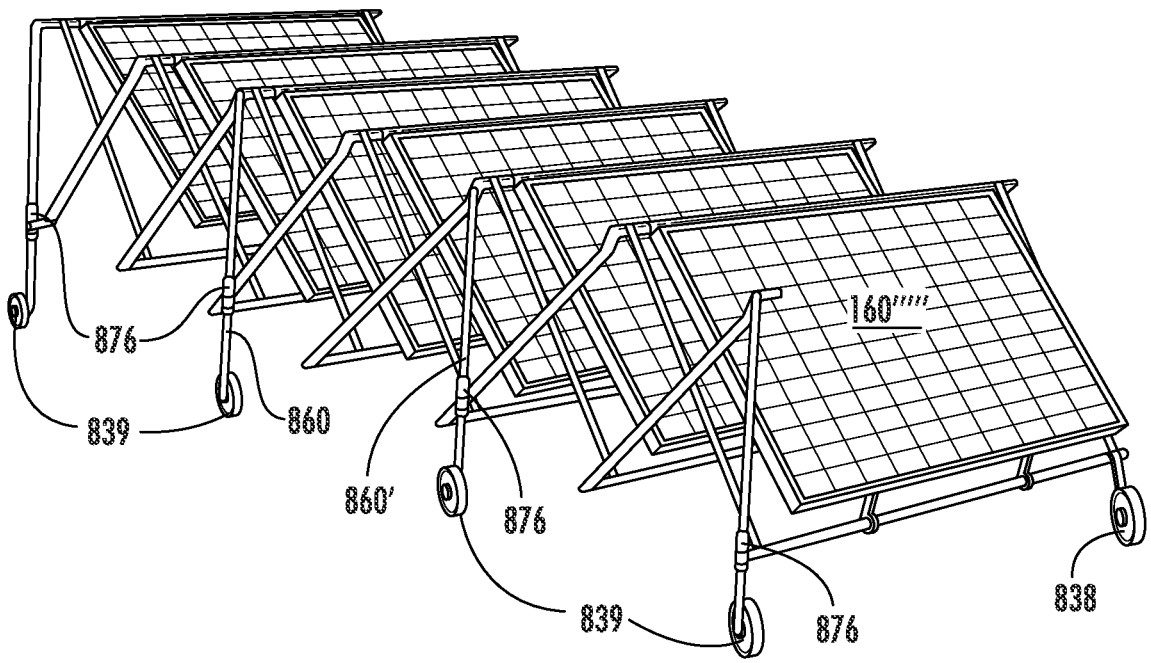
FIG. 40 is a perspective view of the solar panel array of FIG. 33.

Movement of the extension tubes 860 within each of the slide tubes 876 is shown with regard to the progression from FIG. 39 to FIG. 41 and is indicated in FIG. 38 with large double-headed arrows and rotation of the solar panel instances with respect to the extension tubes 860 is indicated in FIG. 38 with a small semicircular double-headed arrow. First, in FIG. 39, the solar panel array 800 is shown in its closed/stored state. In this closed state, the extension tubes 860 are upright (substantially vertical) and the second wheels 839 at the bottom of the extension tubes 859 are close together. Also, the solar panels 160 (here, six in number) are oriented in their vertical-most position, which angle relative to vertical is dependent upon the length of the extension strut 823. The crossbeams of the extensible accordion formed by the left and right side arms 830, 840 and the left and right connector tubes 850 also are in their vertical-most position to define a smallest acute angle therebetween. Finally, in the closed state, the upper and lower frame tubes 820, 822 are parallel to one another and are substantially parallel to ground.

Figure 43:
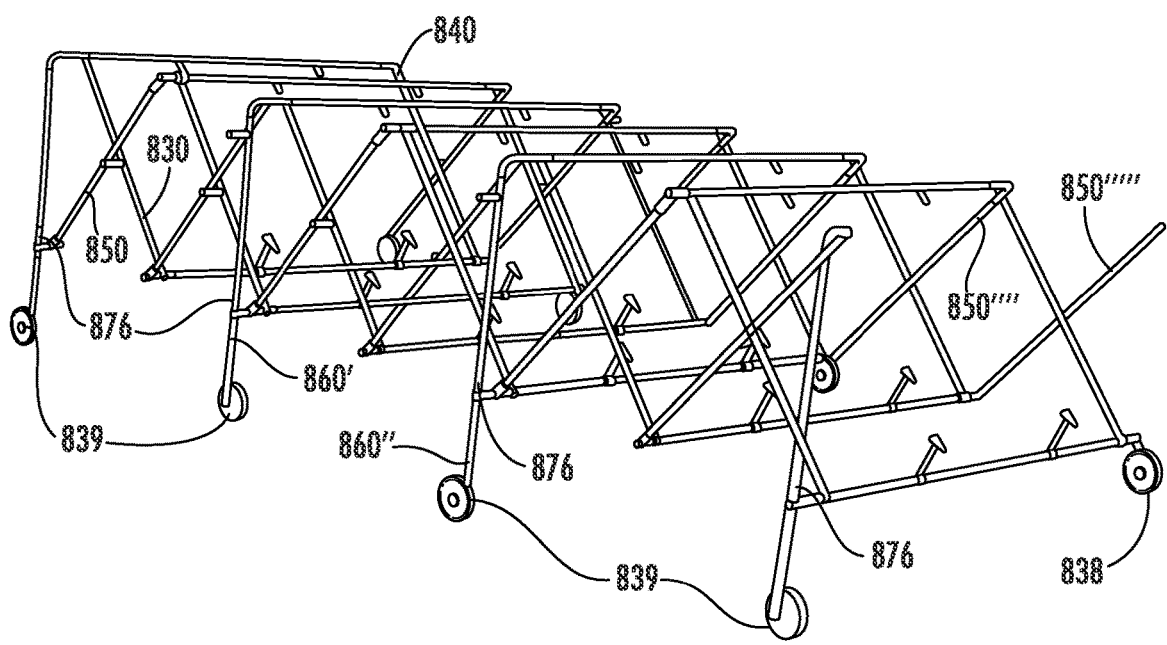
FIG. 43 is a perspective view of the solar panel array of FIG. 33 in an opened state.

As the array 800 is opened, as shown in FIG. 40 and FIG. 43 (where the solar panels 160 are removed), the extension tubes 860 remain substantially upright as the second wheels 839 at the bottom of the extension tubes 860 move apart. The solar panels 160 start pivoting away from vertical and towards horizontal (counterclockwise in the views of FIGS. 39 to 40 and 42 to 43). The left and right side arms 830, 840 and the left and right connector tubes 850 expand their X-shape to a point where the side arms 830, 840, and the connector tubes 850 are approximately orthogonal to one another (forming an angle of about ninety degrees approximately shown in the orientation of FIGS. 40 and 43). Significantly, because the second wheels 839 are not vertically fixed with respect to the lower frame tubes 822 like the first wheels 838, as the solar panel array 800 opens, the extension tubes 860 begin to slide within the slide tubes 876 so that the upper and lower frame tubes 820, 822 no longer remain parallel to ground, and that angle increases (with the vertex at the first wheels 838) the further the solar panel array 800 is opened (it is noted that the upper and lower frame tubes 820, 822 remain substantially parallel to one another through this transition).

The more that the solar panel array 800 is opened, the higher the sliding pivot assemblies 870 rise on the corresponding extension tubes 860, as shown in the opened state of FIG. 41 where the sliding pivot assemblies 870 are almost at the top of the extension tubes 860. In the open state, the extension tubes 860 remain substantially upright (although they are angled inwards towards the solar panels 160). In the opened state, first and second wheels 838, 839 are in their furthest-apart orientation. Because the extension struts 823 are selected to a given length (e.g., between approximately 4 cm and approximately 12 cm, or between approximately 4 cm and approximately 8 cm, or, in particular, approximately 6 cm), the solar panels 160 come to rest at in a co-planar orientation to define the array plane 801 (illustrated, e.g., with the dashed lines in FIG. 42). The crossbeams of the left and right side arms 830, 840 and the left and right connector tubes 850 have rotated to form a greatest obtuse angle therebetween in the opened state. The angle Δ between the array plane 801 and ground causes the orthogonal axis 802 of each solar array panel 160 to point towards the Sun and directly receive the Sun's rays 803 thereon. In an exemplary embodiment, this angle Δ is approximately thirty (30) degrees. An automatic tilt to, for example, thirty degrees is a beneficial configuration to optimize capture of the Sun's rays at many latitudes. The fixed tilt angle Δ is a function of a length of the extension tube 860, which can be dependent upon the size of the solar panels 160. Thus, the slightly larger 72-cell solar panel as compared to a 60-cell solar panel could require a slightly different length of the extension tube 860, which would slightly reduce the tilt angle Δ of the solar panel array 800. In an alternative customizable embodiment, the length of the extension tube 860 can be set to a given value that corresponds to a latitude at which the solar panel array 800 is to be used. Another alternative to the extension tube 860 is to make the length adjustable, for example, by having the extension tube 860 be telescoping/collapsible. Each segment of the telescoping extension tube can have a separate lock (as in the legs of a camera tripod) to permit any length or there can be one or more definite adjustment lengths to permit the extension tube to change to only a few distinct lengths. Much like length indicators on a ski pole, the telescoping section in this embodiment has visible indicators on the outer surface of the extension tube (for example, latitude numbers) and the user, knowing where the array is to be installed, sets the telescope to the particular latitude for that use.

Figure 44:
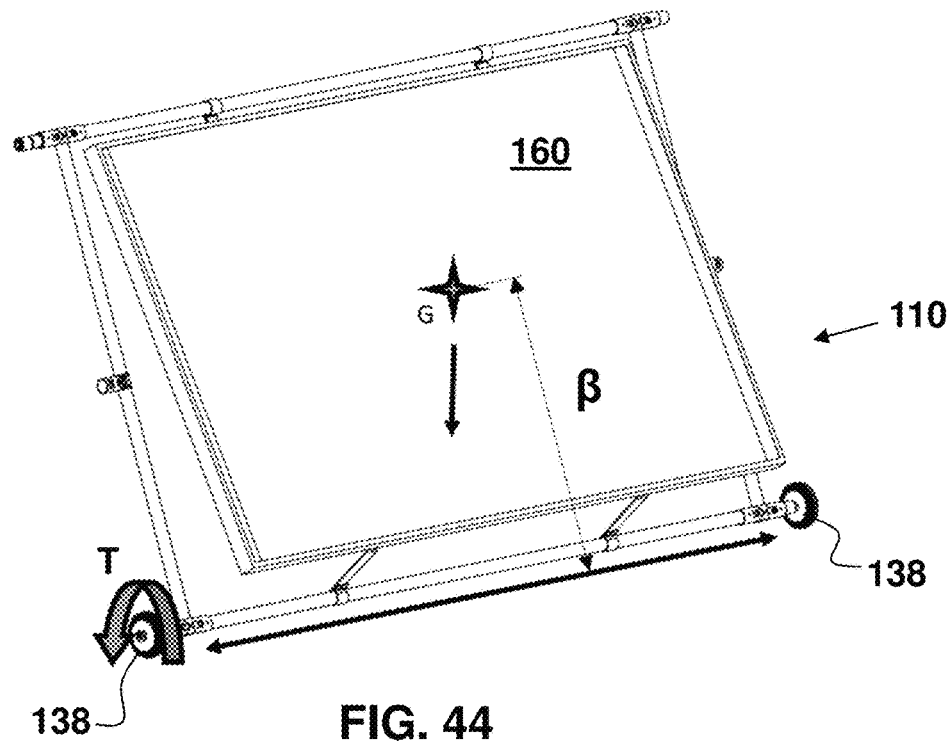
FIG. 44 is a perspective view of a portion of one solar panel frame of the solar panel array of FIG. 7 with a center of gravity depicted.
Figure 45:
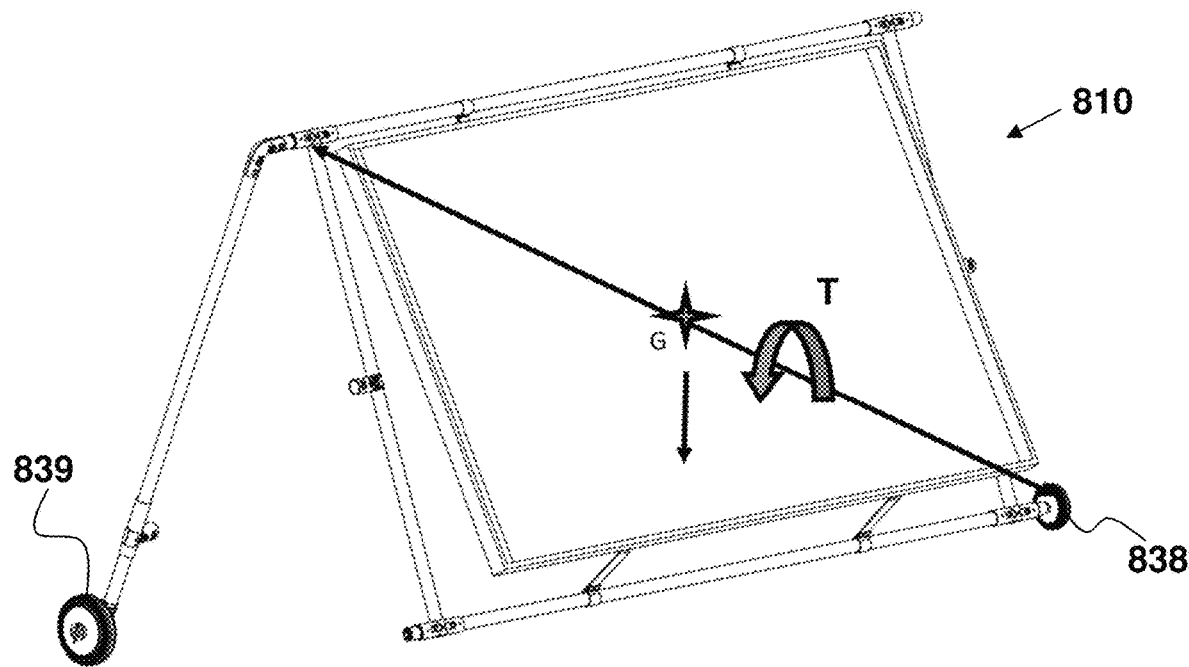
FIG. 45 is a perspective view of a portion of one solar panel frame of the solar panel array of FIG. 33 with a center of gravity depicted.
Figure 46:
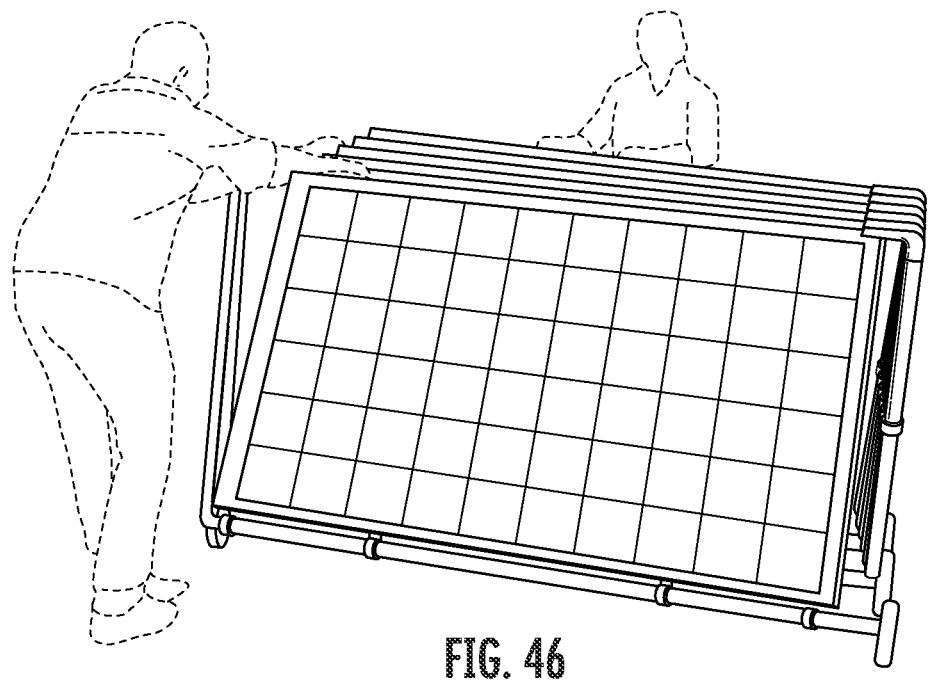
FIG. 46 is a perspective view of the solar panel array of FIG. 33 opened into an approximately one-quarter opened state.
Figure 47:
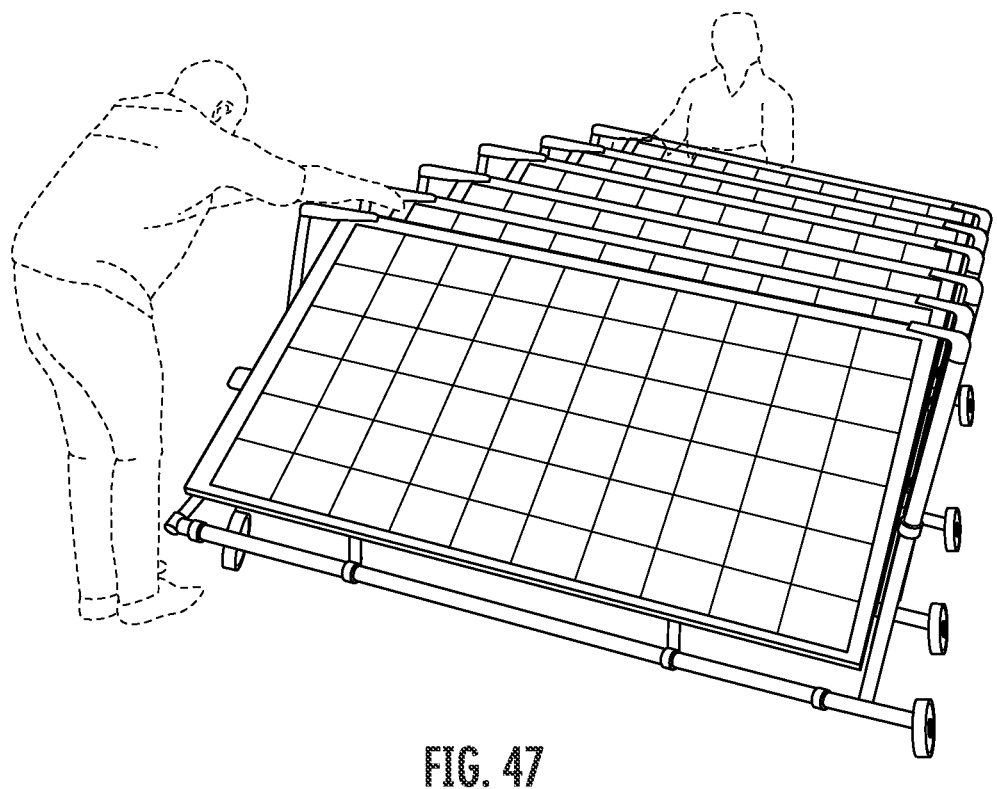
FIG. 47 is a perspective view of the solar panel array of FIG. 33 opened into an approximately one-half opened state.
Figure 48:
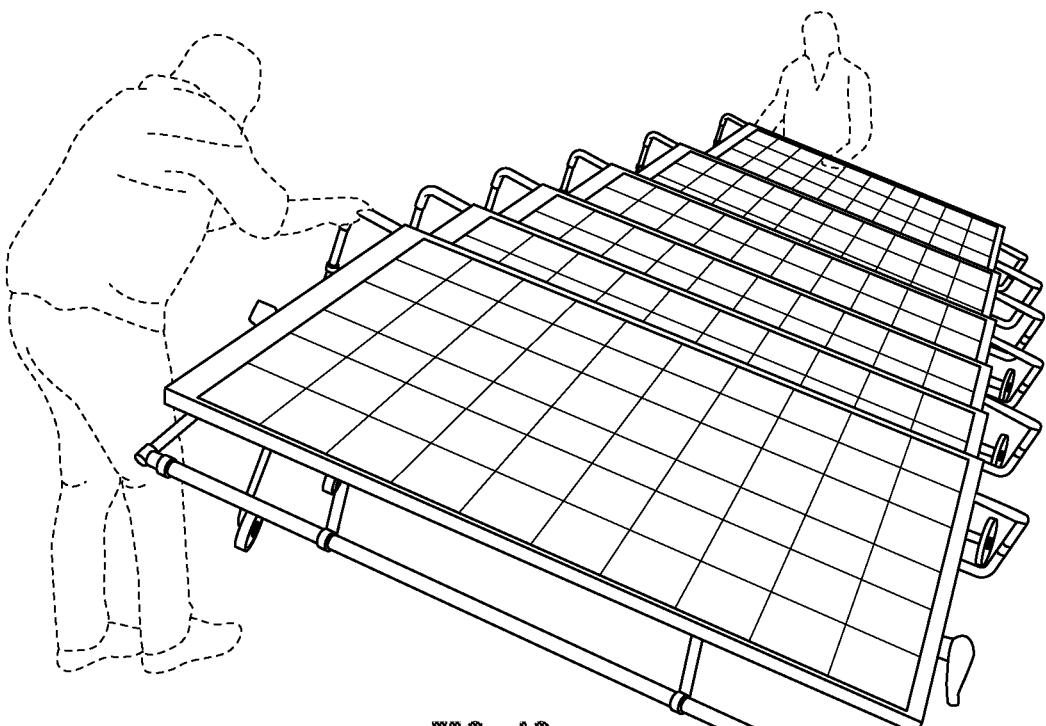
FIG. 48 is a perspective view of the solar panel array of FIG. 33 opened into an approximately three-quarters opened state.
Figure 49:
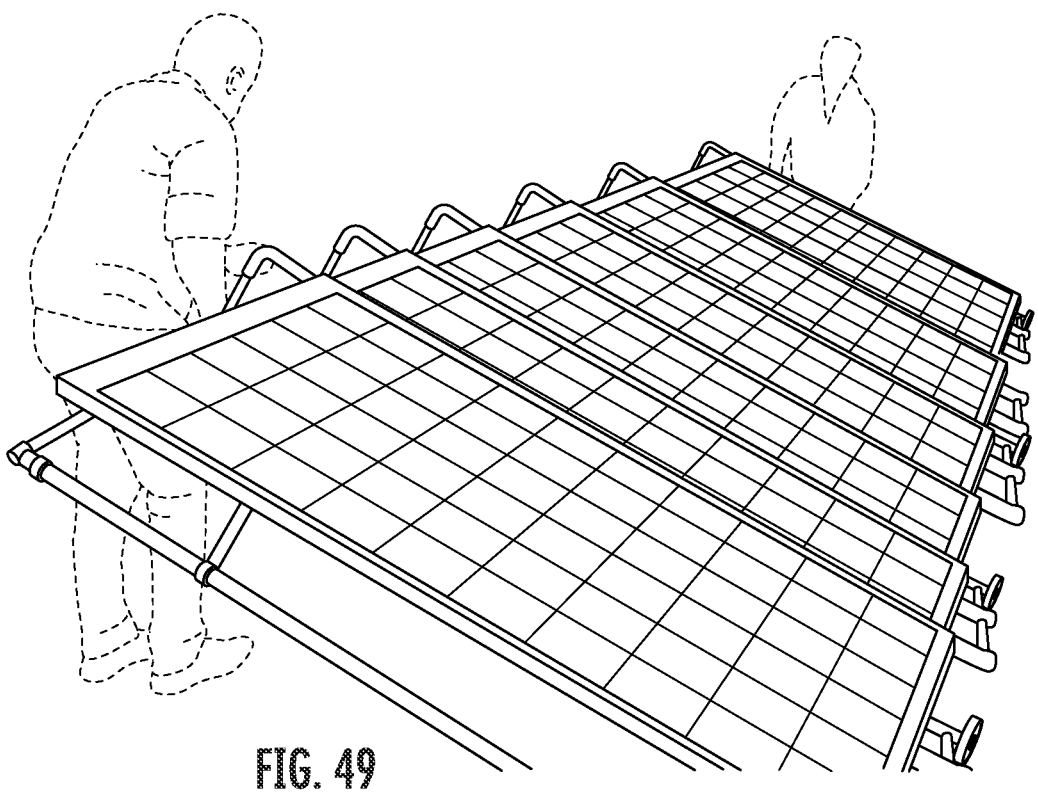
FIG. 49 is a perspective view of the solar panel array of FIG. 33 opened into almost the fully opened state.
Figure 50:
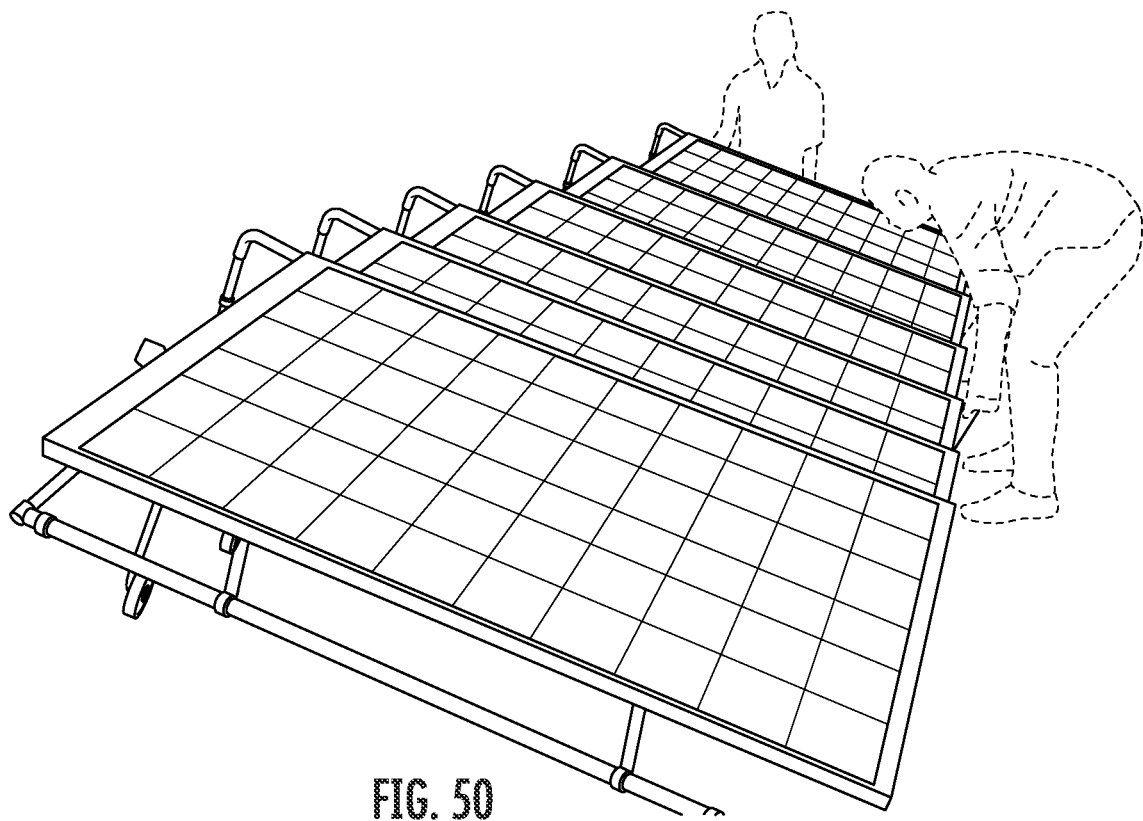
FIG. 50 is a perspective view of the solar panel array of FIG. 33 beginning to close from the fully opened state.
Figure 51:
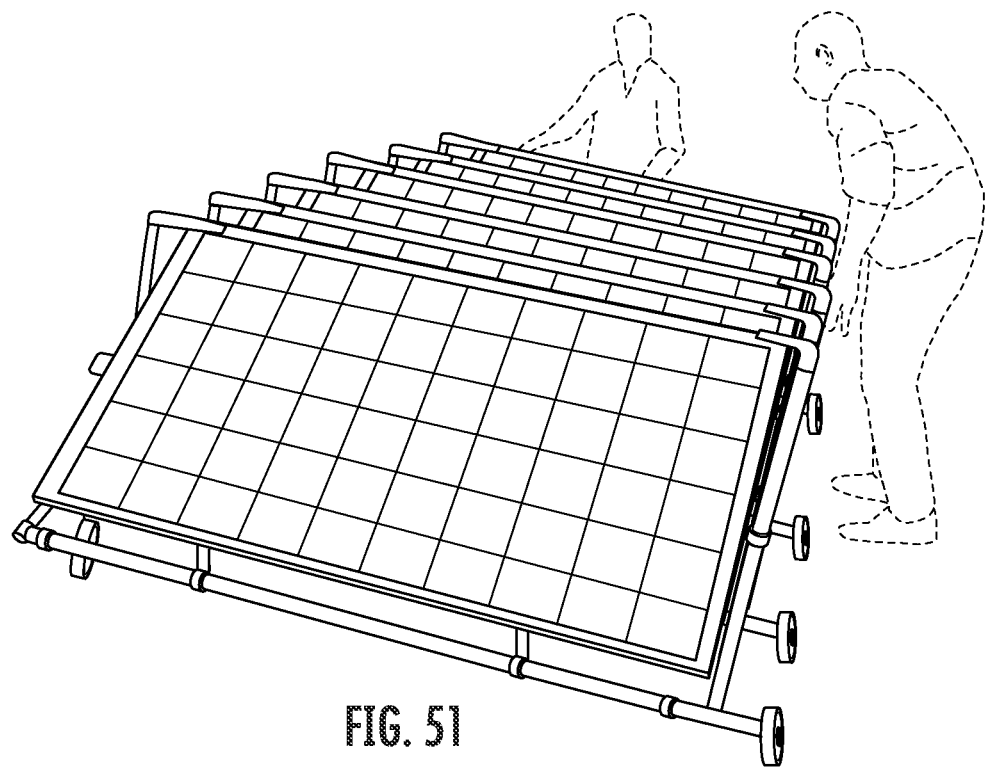
FIG. 51 is a perspective view of the solar panel array of FIG. 33 closing into an approximately one-thirds closed state.
Figure 52:
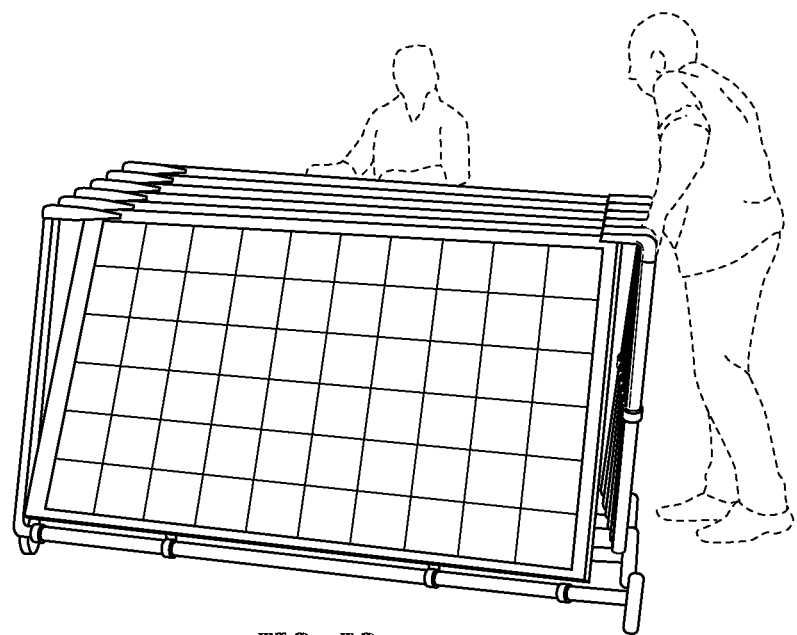
FIG. 52 is a perspective view of the solar panel array of FIG. 33 closing into an approximately two-thirds closed state.
Figure 53:
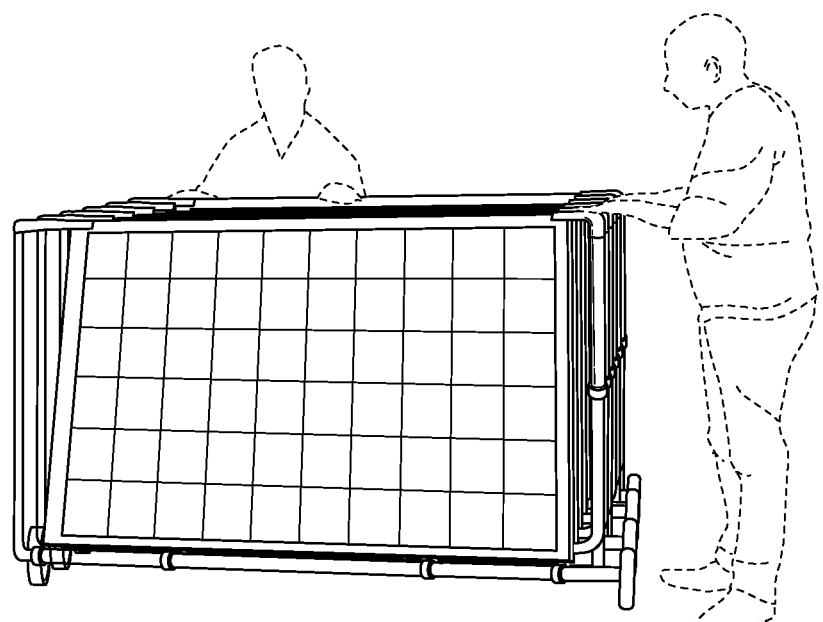
FIG. 53 is a perspective view of the solar panel array of FIG. 33 closing into more than an approximately three-quarters closed state.

As explained above, the configuration of the solar panel array 800 allows it to be opened and closed with less force (i.e., it is easier for one person to open and close the array 800) than the exemplary embodiment of the solar panel array 100. This lower opening/closing force is explained with regard to FIGS. 44 and 45. Because the two wheels 138 of the solar panel frame 110 are fixed on the same axis (see FIG. 44), the center of gravity G is located relative to or away from the two leverage points, i.e., the wheels 138 act as a fulcrum. In FIG. 44, the center of gravity G of the solar panel frame 110 is approximately at the center of the solar panel 160 between, but orthogonally away from, the two wheels 138. If a standard solar panel 160 is assumed, the height β of the center of gravity is approximately 55 cm above the axis extending between the two wheels 138, which causes a torque T of approximately 150 Nm for each panel instance. The mass of the solar panel array 100 in this exemplary configuration, therefore, is enough to make it beneficial to include torsion bars to slow opening and assist in closing. In comparison, as shown in FIG. 45, the wheels 838, 839 are fixed at opposing corners of the solar panel frame 810. This places the center of gravity G virtually exactly at the point of leverage (i.e., the fulcrum), which balances the mass by having a torque T approximately equal to 0 Nm during opening and closing and, thereby, requiring only a slight force to open and close the solar panel array 800. This significantly reduced amount of force eliminates any need to include torsion bars in the mechanism, simplifying the construction and reducing the cost of the frame structure considerably.

With the balance of mass of the solar panel array 800, moving from the closed state to a final open state occurs slowly and easily, as show in the progression in FIGS. 46 to 53. In this progression, the solar panel array 800 goes through a combined movement of both longitudinal expansion and panel tilt, allowing the solar panel array 800 to rest at a final opened position having a positive tilt angle, for example, at approximately thirty degrees as shown, e.g., approximately in FIGS. 49 and 50 where the solar panel array 800 is just slightly collapsed. Another benefit provided by the automatic tilt features is that, once opened, the solar panels 160 rests at an angle to permit self-cleaning (i.e., removal of accumulated dust and dirt), by permitting such debris to slide off the angled surface, induced by gravity, by weather, or by both.

The solar panel array 800 is modular and is used with the array installation 300 and/or the power storage and distribution controller 400 to create a portable, solar power generation facility 500 as described herein. Accordingly, all of the description of this use with regard to other exemplary embodiments is equally applicable to the embodiment of the solar power array 800 but it is not repeated in its entirety. Depending on the size of the solar panel array 800 and on the interior storage area of the compartment 312, 314, 316, 318, if the weight of the solar panel array 800 is sufficiently small, the solar panel arrays 800 can be stacked on top of one another for transport or the interior storage area can have horizontal shelves to separate stacked arrays 800, thereby allowing each compartment 312, 314, 316, 318 to hold more of the arrays 800 therein. This exemplary embodiment for stacking and/or storage can also be applied to the solar panel arrays 100, 600.

In an exemplary embodiment, the arrays 100, 600, 800 are shipped in the container and packed to enable easy and rapid unloading and deployment. The arrays 100, 600, 800 do not need to be physically connected to the container at one end, for example. In this way, while the arrays 100, 600, 800 are linked back to a power management system that can be placed inside the container in which they came (or adjacent the container), users can, for example, place the arrays 100, 600, 800 in accordance with the terrain at which the facility is located, providing more ease and flexibility as compared to a straight-line array of frames integrated into the container at one end as shown in FIGS. 21 to 23 and 25 to 26. In an alternative embodiment or in addition thereto, the arrays 100, 600, 800 can be associated with the container in which they are shipped or they can be entirely separate therefrom. In an exemplary embodiment, the arrays 100, 600, 800 connect to one another by standard electrical extension cables commonly used in traditional solar installations. The connection from the arrays 100, 600, 800 back to the inverter/power management system (PMS) can be in series or in parallel. If in series, each intermediate array is connected to one another array downstream and upstream, the last, distal array is only connected upstream, and the proximal, first array is connected directly to the inverter/PMS, which can be located inside of or separate from the container. If connected in parallel, each array is individually connected back to the inverter/PMS (but the parallel arrays can also be strings of arrays connected in series). Both configurations allow for greater freedom of movement and placement of arrays in the field.

The solar panel arrays 100, 600, 800 can be delivered unassembled (e.g., in kit form), in a semi-assembled state, or pre-assembled depending on the user's needs and preferences. Thus, while the arrays 100, 600, 800 may be packed and shipped in a typical intermodal container, their use in the field may be completely unlinked to a container. For example, they may be connected to a standalone power management (PM) device that connects to a diesel generator (hybrid application), or simply to a PM device and a battery, or both. In other words, the arrays 100, 600, 800 are shipped in containers that may or may not require connection back to the containers once deployed in the field. Due to the modularity of the systems and methods described, the user elects to integrate all electrical systems (e.g., inverter, power management system, and batteries) in the container to have the container serve as a connection hub for the arrays 100, 600, 800, or some of the arrays 100, 600, 800 can be separated and some connected thereto, or all of the arrays 100, 600, 800 can be separate from the container. Regardless of the embodiment selected by the user, the containers provide distinct benefits for power generation solutions described herein because arrays can be instantly folded, repacked, and securely locked back into their original containers, for example, for military mobility, or in the case of severe weather/hurricanes, and quickly reopened after a storm to produce much needed electricity when traditional systems are down for weeks or months.

Each solar panel array 800 is configured to attach to another solar power array 800 in a modular manner and, when so connected, to extend out along an array line and retract back along that array line. The various instances of the solar panel arrays 800 do not need to be connected in straight lines. They can also be set up adjacent one another and connected together (in any parallel or series connection) by non-illustrated power connection cords. A number of solar panel arrays 800 can be removably stored in the array installation 300, whether it is on one side or in a bi-directional manner having opposing openings 310 as shown in FIGS. 21 to 23. If an interior cross-wall 320 is present to define front and back compartments 312, 314, each compartment 312, 314 contains a modular set of solar panel arrays 800 that can be connected in any configuration described or shown. If connected in a single line(s), then the solar panel arrays 800 extend longitudinally as shown in FIGS. 22 and 23. Any number of the solar panel arrays 100 can form a larger string, for example, thirty frames when connected together. A direct connection between each solar panel array 800 in this manner utilizes the exposed upper end of the distal right connector tube 850'''' and the interior side of the upper end of the left connector tube 850''''. The interior side of the upper end of the left connector tube 850'''' removably connects to a junction of the left end of the upper frame tube 820, the upper end of the left side arm 830, and the upper end of the extension tube 860. The exposed upper end of the distal right connector tube 850'''' removably connects to a junction of the right end of the upper frame tube 820 and the upper end of the right side arm 840.

When one or more array installations 300 are used to generate power at a location, a microgrid as described herein is used to store and regulate the power generated by the solar panel arrays 800. Examples are shown in FIGS. 24 to 26.

The solar panel arrays 800 can be used in smaller applications, for example, on a flat roof or for a single home, whether connected in line or separately and in a mechanically unconnected manner (connected electrically in any series or parallel configuration). In such an exemplary configuration, the solar panel arrays 800 are not associated with a housing, such as array installation 300, and, instead, are connected directly to the power grid of the location or to an intermediate electrical panel transfer device electrically disposed between the location and the solar panel array(s) 800. An example of the intermediate electrical panel transfer device is a smaller version of the power storage and distribution controller 400.

One significant benefit provided by the arrays 100, 600, 800 and the installations 300, 400, 500 is that they can be connected to a pre-existing permanent solar installation to augment or replace existing power-generation structures. Beneficially, such an enhancement or retrofit can take minutes or just hours to set up and start generating electricity. This is in contrast to permanent enhancement or retrofit of a traditional solar power generation system, which typically takes weeks to lay the groundwork, to permit (if needed), to pour foundations (e.g., of concrete), and to erect.

Herein, various parts are referred to as "tubes" or "arms" or "struts." These parts, where necessary, are hollow but, where a hollow is not needed, the tubes, arms, and/or struts can be filled and not have hollowed interiors. Also, the tubes, arms, and struts are depicted in various orientations as cylindrical or cuboid. Where a cylindrical or cuboid shape is not needed for function, however, the tubes, arms, and/or struts can have various shaped cross-sections, such as ovular, polygonal, and beam-shaped.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems, apparatuses, and methods. However, the systems, apparatuses, and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems, apparatuses, and methods as defined by the following claims.

What is claimed is:

1. A portable, retractable, solar racking system, comprising:
    a modular set of solar panel frames, each solar panel frame comprising:
    a solar panel;
    a plurality of arms; and
    a plurality of struts, the arms and the struts forming a structure to which the solar panel is secured;
    a pivoting connector assembly mechanically connecting one of the solar panel frames to another one of the solar panel frames to form a solar panel array having a longitudinal extent, the pivoting connector assembly of the solar panel frames configured to:
    collapse the solar panel array along the longitudinal extent into a volume-minimized storage position; and
    expand the solar panel array along the longitudinal extent into an extended position in which each solar panel is tilted from substantially vertical to an angle away from vertical; and
    the solar panel array comprising at least two sets of wheels permitting the solar panel array to roll upon ground,
    wherein: the solar panel has an orthogonal axis;
    the plurality of struts comprise an upper frame strut and a lower frame strut; and
    the pivoting connector assembly of each of the solar panel frames is configured to expand and contract the solar panel array between:
    a closed configuration in which:
        the orthogonal axis of the solar panel is substantially parallel to the longitudinal extent; and
        the upper frame strut and the lower frame strut are substantially parallel to one another and are substantially parallel to ground with the upper frame strut disposed above the lower frame strut to define a first plane being substantially vertical and substantially orthogonal to the longitudinal extent; and
    an open configuration in which the upper and lower frame struts are parallel to one another and not parallel to ground to define a second plane that is at a given angle to ground to place the orthogonal axis of the solar panel at the given angle from vertical.

2. The system according to claim 1, wherein the given angle to ground is between approximately 10 degrees and approximately 40 degrees.

3. The system according to claim 1, wherein the given angle to ground is between approximately 25 degrees and approximately 35 degrees.

4. The system according to claim 1, wherein the given angle to ground is approximately 30 degrees.

5. The system according to claim 1, wherein each of the sets of wheels has a first wheel and the first wheel is adjacent a vertex of the given angle.

6. The system according to anyone of claim 1, wherein the pivoting connector assembly of each of the solar panel frames is configured to expand the solar panel array longitudinally into an extended position in which each solar panel is tilted from substantially vertical to an angle away from vertical such that adjacent ones of the solar panels do not overlap when facing the Sun to an extent that would place shadow from one of the solar panels onto another one of the solar panels.

7. The system according to claim 6, wherein the angle is at least approximately 45 degrees away from vertical.

8. The system according to claim 6, wherein the angle is at least approximately 60 degrees away from vertical.

9. The system according to claim 6, wherein the angle is approximately 90 degrees away from vertical.

10. The system according to anyone of claim 1, wherein the pivoting connector assembly of each of the solar panel frames is configured to expand the solar panel array longitudinally into an extended position in which each solar panel is tilted from substantially vertical to substantially coplanar with each of the other solar panels.

11. The system according to anyone of claims 1, wherein:
    the plurality of arms comprises a first arm and a second arm; and
    the pivoting connector assembly of each of the solar panel frames is configured to expand the solar panel array longitudinally into an extended position in which each solar panel is tilted from substantially vertical to an angle from ground less than approximately 30 degrees and is substantially parallel with the other solar panels.

12. The system according to claim 11, wherein the angle from ground is approximately five degrees.

13. The system according to anyone of claims 1, wherein, in the volume-minimized storage position, each solar panel of the solar panel array is substantially upright.

14. The system according to anyone of claims 1, wherein, in the extended position, each solar panel of the solar panel array tilted from upright to an angle away from vertical of between approximately 45 degrees from vertical to approximately 90 degrees from vertical.

15. The system according to anyone of claims 1 to 14, wherein: the set of solar panel frames comprise six solar panel frames;

and the pivoting connector assembly is five pivoting connector assemblies mechanically connecting one of the solar panel frames to another adjacent one of the solar panel frames to form the solar panel array.

16. The system according to anyone of claim 1, wherein the solar panel array is a plurality of solar panel arrays and each of the solar panel arrays is configured to be connected to another adjacent solar panel array, and which further comprises an array installation having an interior shaped to store the plurality of solar panel arrays therein, the installation being sized and shaped to removably load onto and load off a vehicle with the plurality of solar panel arrays stored therein.

17. The system according to claim 16, wherein: the array installation is a container; and the vehicle is a container truck.

18. The system according to claim 16, wherein the installation further comprises a power storage and distribution controller and which further comprises electrical extension cables electrically connecting the solar panel arrays to one another and electrically connecting at least one of the solar panel arrays to the power storage and distribution controller.

* * * * *